United States Patent
Tokuchi

(10) Patent No.: US 10,805,243 B2
(45) Date of Patent: Oct. 13, 2020

(54) ARTIFICIAL INTELLIGENCE CONVERSATION INTERFACE FOR RECEIVING AND INTERPRETING USER INPUT

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 8 days.

(21) Appl. No.: 16/004,436

(22) Filed: Jun. 11, 2018

(65) Prior Publication Data

US 2019/0081913 A1    Mar. 14, 2019

(30) Foreign Application Priority Data

Sep. 11, 2017 (JP) .................. 2017-174220

(51) Int. Cl.
*H04L 12/58* (2006.01)
*H04L 29/08* (2006.01)

(52) U.S. Cl.
CPC .............. *H04L 51/02* (2013.01); *H04L 51/24* (2013.01); *H04L 67/125* (2013.01)

(58) Field of Classification Search
CPC ........ H04L 51/02; H04L 51/24; H04L 67/125
USPC ......................................................... 709/206
See application file for complete search history.

(56) References Cited

U.S. PATENT DOCUMENTS

| 7,379,950 B2 | 5/2008 | Sato et al. |
| 2007/0156805 A1 | 7/2007 | Bristol et al. |
| 2008/0256107 A1* | 10/2008 | Banga .................. G06Q 10/00 |
| 2010/0138756 A1* | 6/2010 | Saund ................. H04L 12/1827 715/758 |
| 2014/0108334 A1 | 4/2014 | Michalscheck |
| 2014/0244527 A1 | 8/2014 | Michalscheck |
| 2014/0250195 A1* | 9/2014 | Capper ................. G06N 3/004 709/206 |
| 2014/0289192 A1 | 9/2014 | Michalscheck |
| 2014/0333963 A1 | 11/2014 | Nakamura |
| 2015/0168937 A1 | 6/2015 | Michalscheck et al. |
| 2015/0172505 A1* | 6/2015 | Park ................... H04N 1/00307 358/1.15 |

(Continued)

FOREIGN PATENT DOCUMENTS

| JP | S595334 | 1/1984 |
| JP | H096790 | 1/1997 |

(Continued)

OTHER PUBLICATIONS

Microsoft, Print command, 2009 https://docs.microsoft.com/en-us/previous-versions/orphan-topics/ws.10/cc772773(v=ws.10)?redirectedfrom=MSDN (Year: 2009).*

(Continued)

*Primary Examiner* — James E Springer
(74) *Attorney, Agent, or Firm* — JCIPRNET

(57) ABSTRACT

An information processing device includes a controller that, when an instruction content including information indicating a content of a service and information of a resource to be used for the service is transmitted to a conversation partner in an interface where a user makes a conversation with the conversation partner, controls a notification of information on a process corresponding to the instruction content.

20 Claims, 20 Drawing Sheets

(56) References Cited

U.S. PATENT DOCUMENTS

| | | | |
|---|---|---|---|
| 2015/0244656 A1* | 8/2015 | Choi | H04N 21/4788 709/206 |
| 2016/0050326 A1* | 2/2016 | Lee | H04N 21/2223 358/402 |
| 2016/0092522 A1* | 3/2016 | Harden | G06F 16/254 707/602 |
| 2016/0094507 A1* | 3/2016 | Li | G06F 16/951 709/206 |
| 2016/0306334 A1 | 10/2016 | Michalscheck et al. | |
| 2017/0090831 A1* | 3/2017 | Januszewski | G06F 3/126 |
| 2017/0148335 A1 | 5/2017 | Michalscheck et al. | |
| 2017/0322691 A1 | 11/2017 | Tokuchi | |
| 2017/0322759 A1 | 11/2017 | Tokuchi | |
| 2017/0324876 A1 | 11/2017 | Tokuchi | |
| 2017/0324877 A1 | 11/2017 | Tokuchi | |
| 2017/0324879 A1 | 11/2017 | Tokuchi | |
| 2017/0324881 A1 | 11/2017 | Tokuchi | |
| 2017/0344326 A1* | 11/2017 | Yagiura | G06F 3/1292 |
| 2018/0104816 A1 | 4/2018 | Tokuchi | |
| 2018/0109691 A1 | 4/2018 | Tokuchi | |
| 2018/0227251 A1* | 8/2018 | Takishima | G06F 3/1287 |
| 2018/0358006 A1* | 12/2018 | McConnell | H04L 51/02 |
| 2018/0358010 A1* | 12/2018 | Eidem | G10L 15/30 |

FOREIGN PATENT DOCUMENTS

| | | |
|---|---|---|
| JP | H19091108 | 4/1997 |
| JP | 2004206170 | 7/2004 |
| JP | 2005056170 | 3/2005 |
| JP | 2009522687 | 6/2009 |
| JP | 2013025638 | 2/2013 |
| JP | 2014006306 | 1/2014 |
| JP | 2014238823 | 12/2014 |
| JP | 6052459 | 12/2016 |
| JP | 6075501 | 2/2017 |
| JP | 6179653 | 8/2017 |

OTHER PUBLICATIONS

"Office Action of Japan Counterpart Application," dated Jul. 31, 2018, with English translation thereof, p. 1-p. 2.

"Office Action of Japan Counterpart Application", dated Aug. 13, 2019, with English translation thereof, pp. 1-6.

* cited by examiner

<DEVICE FUNCTION MANAGEMENT TABLE>

| DEVICE ID | DEVICE NAME (TYPE) | FUNCTION | IMAGE ID |
|---|---|---|---|
| A | PC | DISPLAYING FUNCTION, SAVING FUNCTION | ... |
| B | MULTIFUNCTION MACHINE | PRINTING FUNCTION, SCANNING FUNCTION, COPYING FUNCTION, FAXING FUNCTION, POST-PROCESSING FUNCTION | ... |
| C | PROJECTOR | PROJECTING FUNCTION | ... |
| ... | ... | ... | ... |

FIG.7

<LINKAGE FUNCTION MANAGEMENT TABLE>

| DEVICE ID COMBINATION | DEVICE NAME (TYPE) | LINKAGE FUNCTION |
|---|---|---|
| A, B | PC (A), MULTIFUNCTION MACHINE (B) | SCANNING TRANSMITTING FUNCTION |
| | | PRINTING FUNCTION |
| A, C | PC (A), PROJECTOR (C) | PROJECTING FUNCTION |
| | | PRINTING FUNCTION |
| B, C | MULTIFUNCTION MACHINE (B), PROJECTOR (C) | PROJECTING FUNCTION |
| | | PRINTING FUNCTION |
| ... | ... | ... |

FIG.8

| DEVICE ID | DEVICE NAME (TYPE) | POSITION IN IMAGE | FUNCTION | IMAGE ID |
|---|---|---|---|---|
| A | PC | ... | SCREEN DISPLAYING FUNCTION | ... |
| | | ... | DATA SAVING FUNCTION | |
| | | ... | ... | |
| B | MULTIFUNCTION MACHINE | ... | PRINTING FUNCTION | ... |
| | | ... | SCANNING FUNCTION | |
| | | ... | STAPLING FUNCTION | |
| | | ... | ... | |
| ... | ... | ... | ... | ... |

<PORTION MANAGEMENT TABLE>

FIG.9

<PORTION MANAGEMENT TABLE>

| DEVICE ID | DEVICE NAME (TYPE) | PORTION | PORTION ID | FUNCTION | PORTION IMAGE ID |
|---|---|---|---|---|---|
| A | PC | DISPLAY UNIT | Aa | SCREEN DISPLAYING FUNCTION | ... |
|   |    | MAIN BODY PORTION | Ab | DATA SAVING FUNCTION | ... |
|   |    | ... | ... | ... | ... |
| B | MULTI FUNCTION MACHINE | MAIN BODY PORTION | Ba | PRINTING FUNCTION | ... |
|   |    | READEING UNIT | Bb | SCANNING FUNCTION | ... |
|   |    | POST-PROCESSING DEVICE | Bc | STAPLING FUNCTION | ... |
|   |    | ... | ... | ... | ... |
| C | PROJECTOR | MAIN BODY PORTION | Ca | PROJECTING FUNCTION | ... |
|   |    | ... | ... | ... | ... |
| ... | ... | ... | ... | ... | ... |

FIG.10

<LINKAGE FUNCTION MANAGEMENT TABLE>

| COMBINATION OF PORTIONS OF DEVICES | PORTION ID COMBINATION | LINKAGE FUNCTION |
|---|---|---|
| DISPLAY UNIT OF PC A, MAIN BODY PORTION OF MULTIFUNCTION MACHINE B | Aa, Ba | PRINTING FUNCTION |
|  | ... | ... |
| MAIN BODY PORTION OF MULTIFUNCTION MACHINE B, MAIN BODY PORTION OF PROJECTOR C | Ba, Ca | PRINTING FUNCTION |
|  | ... | ... |
| READING UNIT OF MULTIFUNCTION MACHINE B, MAIN BODY PORTION OF PROJECTOR C | Bb, Ca | SCANNING PROJECTING FUNCTION |
|  | ... | ... |

FIG.11

<LINKAGE FUNCTION MANAGEMENT TABLE>

| FUNCTION ID COMBINATION | FUNCTION NAME (TYPE) | LINKAGE FUNCTION |
|---|---|---|
| α, β | DATA TRANSMITTING (α), PASSWORD SETTING (β) | ... |
|  |  | ... |
| α, γ | DATA TRANSMITTING (α), SOUND OUTPUTTING (γ) | ... |
|  |  | ... |
| β, γ | PASSWORD SETTING (β), SOUND OUTPUTTING (γ) | ... |
|  |  | ... |
| ... | ... | ... |

FIG.12

<LINKAGE FUNCTION MANAGEMENT TABLE>

| ID COMBINATION | DEVICE NAME, FUNCTION NAME(TYPE) | LINKAGE FUNCTION |
|---|---|---|
| A, α | PC (A), DATA TRANSMITTING (α) | ... |
| | | ... |
| A, β | PC (A), PASSWORD SETTING (β) | ... |
| | | ... |
| B, α | MULTIFUNCTION MACHINE (B), DATA TRANSMITTING (α) | ... |
| | | ... |
| ... | ... | ... |

FIG.13

<LINKAGE FUNCTION MANAGEMENT TABLE>

| COMBINATION OF FILE FORMATS | LINKAGE FUNCTION |
|---|---|
| DOCUMENT FORMAT, TABLE FORMAT | · INSERT TABLE INTO DOCUMENT, · INSERT DOCUMENT INTO TABLE |
| DOCUMENT FORMAT, IMAGE FORMAT | · INSERT IMAGE INTO DOCUMENT, · SUPERIMPOSE DOCUMENT ON IMAGE |
| DOCUMENT FORMAT, VIDEO FORMAT | · INSERT VIDEO INTO DOCUMENT, · INSERT STILL IMAGE INTO DOCUMENT |
| DOCUMENT FORMAT, DOCUMENT FORMAT | · INTEGRATE DOCUMENTS WITH EACH OTHER |
| TABLE FORMAT, TABLE FORMAT | · INTEGRATE TABLES WITH EACH OTHER |
| VIDEO FORMAT, VIDEO FORMAT | · INTEGRATE VIDEOS WITH EACH OTHER |
| SPREADSHEET FORMAT, DOCUMENT FORMAT | · INSERT DOCUMENT INTO PRESENTATION SHEET |
| ... | ... | ns
ARTIFICIAL INTELLIGENCE CONVERSATION INTERFACE FOR RECEIVING AND INTERPRETING USER INPUT

CROSS-REFERENCE TO RELATED APPLICATIONS

This application is based on and claims priority under 35 USC 119 from Japanese Patent Application No. 2017-174220 filed Sep. 11, 2017.

BACKGROUND

Technical Field

The present invention relates to an information processing device, an information processing method, and a non-transitory computer readable medium.

SUMMARY

According to an aspect of the invention, an information processing device includes a controller that, when an instruction content including information indicating a content of a service and information of a resource to be used for the service is transmitted to a conversation partner in an interface where a user makes a conversation with the conversation partner, controls a notification of information on a process corresponding to the instruction content.

BRIEF DESCRIPTION OF THE DRAWINGS

Exemplary embodiments of the present invention will be described in detail based on the following figures, wherein:

FIG. 7 is a view illustrating a linkage function management table;

FIG. 8 is a view illustrating a portion management table;

FIG. 9 is a view illustrating a portion management table;

FIG. 10 is a view illustrating a linkage function management table;

FIG. 11 is a view illustrating a linkage function management table;

FIG. 12 is a view illustrating a linkage function management table;

FIG. 13 is a view illustrating a linkage function management table;

DETAILED DESCRIPTION

Figure 1:
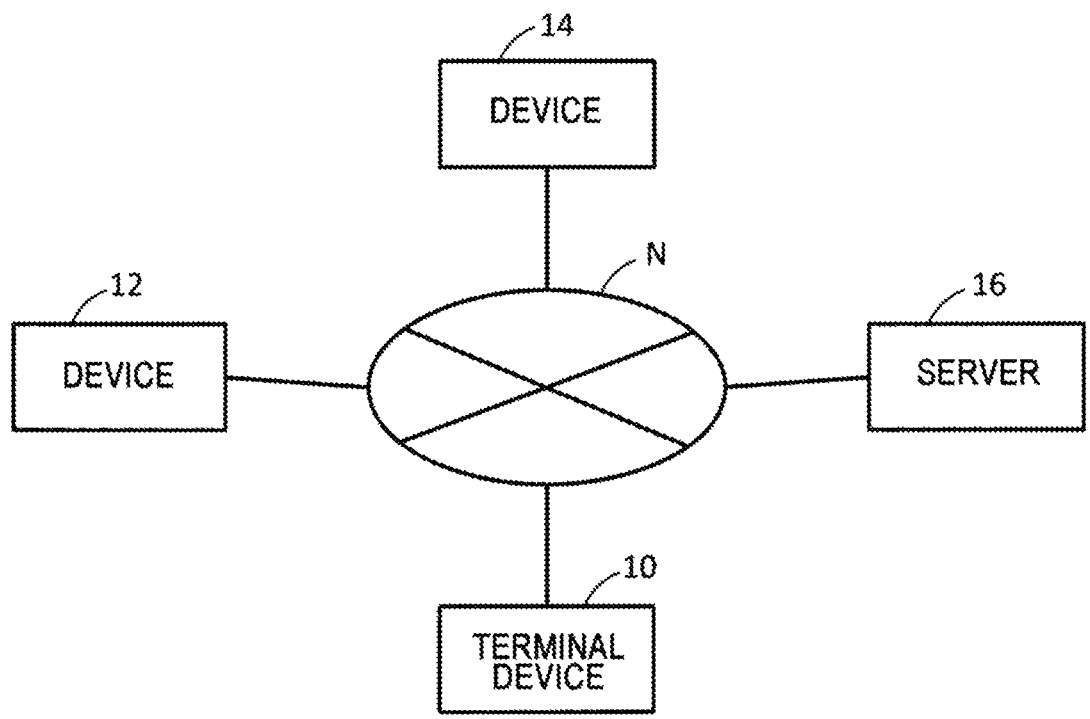
FIG. 1 is a block diagram illustrating a configuration of a device system according to an exemplary embodiment of the present invention.

A device system which is an information processing system according to an exemplary embodiment of the present invention will be described with reference to FIG. 1. FIG. 1 illustrates an example of a device system according to the present exemplary embodiment.

The device system according to the present exemplary embodiment includes, for example, a terminal device 10, plural devices (e.g., devices 12 and 14), and a server 16 which is an example of an external device. In the example illustrated in FIG. 1, the terminal device 10, the devices 12 and 14, and the server 16 have a function of communicating with each other via a communication path N such as a network. The terminal device 10, the devices 12 and 14, and the server 16 may communicate with another device via different communication paths, rather than using the communication path N. In the example illustrated in FIG. 1, the device system includes two devices (the devices 12 and 14). However, the device system may include one device or three or more devices. In addition, the device system may include plural terminal devices 10 or plural servers 16. In addition, the device system may not include the devices 12 and 14 or the server 16.

The terminal device 10 is a device such as a personal computer (PC), a tablet PC, a smart phone, or a mobile phone, and has a function of transmitting and receiving data with another device. In addition, the terminal device 10 may be a wearable terminal (for example, a wristwatch type terminal, a wristband type terminal, an eyeglass type terminal, a ring type terminal, a contact lens type terminal, an intracorporeal implanting type terminal, or a hearable terminal).

Each of the devices 12 and 14 has a function and is, for example, an image forming device having an image forming function, a PC, a tablet PC, a smart phone, a mobile phone, a robot (for example, a humanoid robot, an animal (other than human) type robot, or another type robot), a projector, a display device such as a liquid crystal display, a recording device, a playback device, an image capturing device such as a camera, a refrigerator, a rice cooker, a microwave oven, a coffee maker, a vacuum cleaner, a washing machine, an air conditioner, a lighting device, a watch, a surveillance camera, an automobile, a motorcycle, an aircraft (for example, an unmanned aircraft (so-called, drone)), a game device, or various sensing devices (for example, a temperature sensor, a humidity sensor, a voltage sensor, or a current sensor). Each of the devices 12 and 14 may be a device that outputs an output to a user (for example, an image forming device or a PC) or a device that outputs no output to the user (for example, a sensing device). In addition, all of plural devices executing a linkage function which will be described later may output an output to the user. Some of the devices may output an output to the user, and the other devices may not output an output to the user. All the devices may not output an output to the user. The concept of the devices 12 and 14 may include all general kinds of devices. For example, the devices according to the present exemplary embodiment may also include an information device, a video device, an audio device, and other devices. In addition, the devices 12 and 14 have a function of transmitting and receiving data with other devices.

The server 16 is a device that manages, for example, data, user information, and the devices 12 and 14. Further, the server 16 has a function of transmitting and receiving data with other devices.

In the terminal device 10, a conversation partner having a function of making a conversation with a user is used. For example, the conversation partner has a function of receiving a message of a user, analyze the content of the message, create a response such as a reply to the message, and provide the response to the user. For example, the user's message is made by character input, voice input, image input or the like. The response such as the reply is made by character output, voice output, image output or the like. The conversation partner is implemented by, for example, executing a program, and the program is installed in, for example, the terminal device 10. In addition, the program for the conversation partner may be installed in an external device such as the server 16 such that the function of the conversation partner may be provided from the external device such as the server 16 to the terminal device 10.

The conversation partner described above is configured with, for example, an automatic response artificial intelligence (AI) implemented by AI. The automatic response AI has a function of analyzing a message content of a user and providing the user with a response such as a reply to the message content. The automatic response AI may be a so-called chatbot (an automatic chatting program using AI). The automatic response AI may have a learning function by AI and have an ability to make a determination similar to a human decision through the learning function. In addition, neural network type deep learning may be used, reinforcement learning or the like for partially reinforcing a learning field may be used, or a genetic algorithm, cluster analysis, a self-organization map, ensemble learning and others may be used. In addition, an AI related technology other than the technologies described above may be used.

In addition, the automatic response AI may search information by using, for example, the Internet, analyze the search result, and reflect the analysis result on a reply. In addition, the automatic response AI may manage, for example, the history of use of various applications by the user, the history of an operation of the terminal device 10 by the user, and the history of use of the devices 12 and 14 by the user. In addition, the automatic response AI may acquire information from the automatic response AIs stored in the other different devices by communicating with the automatic response AIs. The automatic response AI may reflect the information managed by the own automatic response AI or the acquired information, on the response.

When the automatic response AI is used, for example, an input of information indicating a content of an instruction from the user or a notification of information on a process corresponding to the instruction content is performed while the user makes a conversation with the automatic response AI. The information indicating the instruction content includes information indicating a content of a service requested by the user and information of a resource to be used for the service (information of a resource designated by the user). The resource is, for example, a device, a function (including a function implemented by hardware such as a device and a function implemented by software (program)), a file (data), environments (e.g., a place or a person) or others. As the information on the process corresponding to the instruction content, for example, information indicating a candidate of a resource necessary for executing the process corresponding to the instruction content (hereinafter, referred to as a "resource candidate") is notified. As the information indicating a resource candidate, information indicating, for example, a function or a device necessary for executing the process is notified. The service or the resource candidate will be described in detail later. In addition, the notification described above may be performed by the terminal device 10 or an external device such as the server 16.

Figure 2:
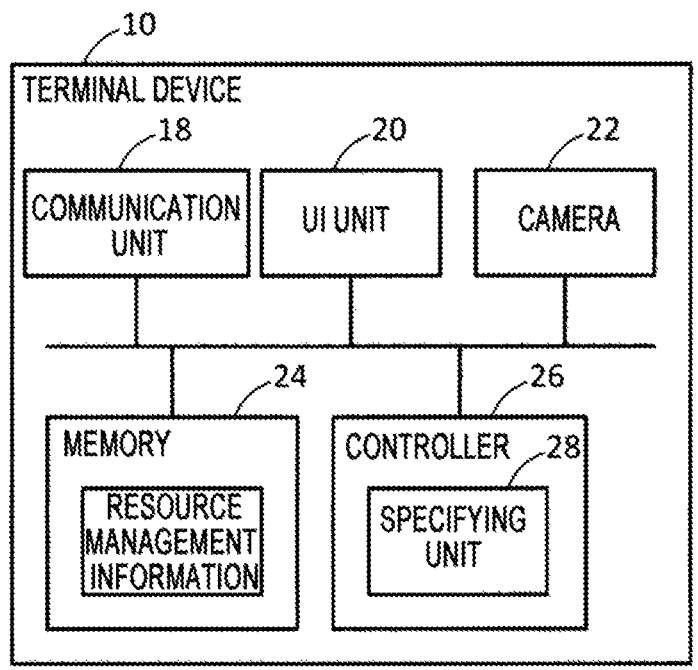
FIG. 2 is a block diagram illustrating a configuration of a terminal device.

Hereinafter, a configuration of the terminal device 10 will be described in detail with reference to FIG. 2.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi (registered trademark) communication, or a near-field wireless communication (for example, a near field communication (NFC)). As for the near-field wireless communication, for example, Felica (registered trademark), Bluetooth (registered trademark), or a radio frequency identifier (RFID) is used. Another type of a wireless communication may be used as the near-filed wireless communication. The communication unit 18 may switch a communication method or a frequency band according to, for example, a communication partner or a surrounding environment.

A UI unit 20 is a user interface unit and includes a display unit and an operation unit. The display unit is, for example, a display device such as a liquid crystal display. The operation unit is, for example, an input device such as a touch panel or a keyboard. In addition, the UI unit 36 may be a user interface serving as both the display unit and the operation unit (for example, a touch type display or a device of which display electronically displays a keyboard or the like). In addition, the UI unit 20 may include a sound collecting unit such as a microphone and a sound generating unit such as a speaker. In this case, information may be input to the terminal device 10 by a voice input or information may be output by voice.

The display unit of the UI unit 20 may display, for example, an image captured by a camera, a device image associated with a device identified as a device to be used for the service (e.g., a device to be used alone or a device to be linked), a function image associated with a function, and a file image associated with a file. The device image may be an image (a still image or a video clip) representing the device captured by a camera or an image schematically representing the device (e.g., an icon). For example, the image data schematically representing the device may be created by a controller 26 of the terminal device 10, stored in advance in a memory 24 of the terminal device 10, stored in the server 16 to be provided from the server 16 to the terminal device 10, or stored in another device to be provided from the other device to the terminal device 10. The function image is, for example, an image such as an icon representing the function. The file image is, for example, an icon representing the file.

A camera 22 which is an image capturing unit generates image data (for example, still image data or video data) by capturing an object to be captured. The image is displayed on, for example, the display unit of the UI unit 20. The image displayed on the display unit may be operated by the user. In addition, image data obtained by capturing with an external camera may be transmitted to the terminal device 10 via a communication path, and the image may be displayed on the display unit of the UI unit 20. In this case as well, the image may be operated by the user.

The memory 24 is a storage device such as a hard disk or a memory (for example, an SSD). The memory 24 stores, for example, resource management information, various data, various programs (e.g., an operation system (OS)), a program (software) for implementing the automatic response AI, various application programs (e.g., application software), information indicating an address of each device (device address information), information indicating an address of the server 16 (server address information), information on an identified device, information on an identified device to be linked, information on a function that an identified device has, and information on a linkage function. These pieces of information may be stored in different storage devices or in a single storage device. In addition, the program for implementing the automatic response AI may be stored in an external device such as the server 16, such that the program itself may be executed by the external device, and the function of the automatic response AI may be provided from the external device to the terminal device 10. In this case, the program for implementing the automatic response AI may not be stored in the memory 24.

Hereinafter, the resource management information will be described in detail. The resource management information is information for managing a function (including a solo function executable by using a single resource and a linkage function executable by using plural resources) executable by using a resource (e.g., a device, a function, or a file). The resource management information includes, for example, device function management information and linkage function management information. As described later, the resource management information is not limited to the example described above.

The device function management information is information for managing a function that a device has and is, for example, information indicating an association between device identification information for identifying a device and function information indicating a function that the device has. The device identification information is, for example, a device ID, a device name, information indicating a device type, a model number of a device, information for managing a device (for example, an asset management number), information indicating a position where a device is installed (device position information), a device image associated with a device, and address information of a device. The device image is, for example, an external appearance image representing a device. The external appearance image may be an image representing an outer side of a device (for example, a casing of a device), an image representing a state where the casing is opened such that the inside of the device is seen from the outside (for example, the internal structure), or an image representing a state where the device is covered with, for example, a packing sheet. The device image may be an image generated by capturing a device (for example, an image representing the outer side or the inside of a device) or an image emulating a device (for example, an icon). The function information is, for example, a function ID or a function name. For example, in a case where the device 12 is an image forming device and the image forming device has a printing function, a scanning function, and a copying function, the device identification information of the image forming device is associated with, for example, function information indicating the printing function, function information indicating the scanning function, and function information indicating the copying function. The function that each device has is specified (identified) by referring to the device function management information.

A device managed by the device function management information is, for example, a device included in the device system (for example, the device 12 or 14). In addition, a device which is not included in the device system may be managed by the device function management information. For example, the terminal device 10 may acquire information on a new device which is not included in the device system (including the device identification information and the function information), and newly register the information in the device function management information. The information on a device may be acquired by using, for example, the Internet or may be input by, for example, an administrator. In addition, the terminal device 10 may update the device function management information, for example, at any timing, regularly, or at a timing designated by, for example, an administrator. Thus, function information indicating the function that a device did not have before updating but the device has after updating may be registered in the device function management information. Similarly, function information indicating the function that a device did not have before updating but the device has after updating may be deleted from the device function management information or registered as unusable information. Information for the updating may be acquired by using, for example, the Internet or may be input by, for example, an administrator. In addition, the terminal device 10 itself may not acquire the information on a device to perform the generation or updating of the device function management information. An external device such as the server 16 may acquire the information on a device and perform the generation or updating of the device function management information. In this case, the device function management information generated or updated by the external device is transmitted from the external device to the terminal device 10 and stored in the memory 24.

The linkage function management information is information for managing a linkage function which is executed by linking plural functions to each other. One or plural linkage functions is executed by linking plural functions to each other. For example, the linkage function may be a function executable by linking plural functions that a single device (for example, the device 12) has to each other, or a function executable by linking plural functions that plural devices (for example, the devices 12 and 14) have to each other. In addition, the terminal device 10 that makes an operation instruction may also be used as a device to be linked, and the function that the terminal device 10 has may also be used as a portion of the linkage function.

The linkage function may be executed without using hardware devices. For example, the linkage function may be executed by linking plural pieces of software to each other. In addition, the linkage function may be executed by linking the function that a hardware device has and the function implemented by software to each other.

The linkage function management information represents, for example, an association between a combination of pieces of function information indicating respective functions used for a linkage function and linkage function information indicating the linkage function. The linkage function information is, for example, a linkage function ID or a linkage function name. When a solo function is updated, the linkage function management information is also updated according to the updating of the solo function. Thus, a linkage function by plural functions which are unable to be linked to each other before updating may become usable after updating, or in the meantime, a linkage function which is usable before updating may become unusable after updating. The linkage function information indicating the linkage function which becomes usable after updating is registered in the linkage function management information, and the linkage function information indicating the linkage function which becomes unusable after the updating is deleted from the linkage function management information or registered as unusable information. The updating of the linkage function management information may be performed by the terminal device 10 or an external device such as the server 16. When the updating of the linkage function management information is executed by an external device, the updated linkage function management information is transmitted from the external device to the terminal device 10 and stored in the memory 24.

When plural devices are linked to each other, the linkage function management information is, for example, information for managing a linkage function using plural functions that the plural devices have, and indicates an association between a combination of pieces of device identification information for identifying the respective devices used for the linkage function and the linkage function information. In addition, when a device having plural output functions (a device having plural output functions to output an output to the user) and a sensing device which does not have the output function (a device outputting no output to the user) are linked to each other, the linkage function management information may include information indicating a combination of the specific sensing device and a specific one of the plural output functions. Accordingly, among the plural output functions, an output function to be used in combination with the specific sensing device is specified. As described above, when the device function management information is updated, the linkage function management information is also updated according to the updating of the device function management information. Thus, a linkage function by plural devices which are unable to be linked to each other before updating may become usable after updating, or in the meantime, a linkage function which is usable before updating may become unusable after updating.

The linkage function may be a function executable by linking plural different functions to each other or a function executable by linking identical functions to each other. The linkage function may be a function which is unusable before the linkage. The function which is unusable before the linkage may be a function usable by using identical functions among functions that devices to be linked have or a function usable by combining different functions with each other among functions that devices to be linked have. For example, when a device having the printing function (a printer) and a device having the scanning function (a scanner) are linked to each other, a copying function is implemented as a linkage function. That is, the copying function is implemented by linking the printing function and the scanning function to each other. In this case, the copying function which is a linkage function is associated with the combination of the printing function and the scanning function. For example, in the linkage function management information, linkage function information indicating the copying function as the linkage function is associated with the combination of device identification information for identifying the device having the printing function and device identification information for identifying the device having the scanning function.

The concept of the linkage function may include a coalescing function which executes a new function by linking plural functions or plural devices to each other. For example, an extended displaying function as a coalescing function may be implemented by combining plural displays. As another example, a recording function as a coalescing function may be implemented by combining a television and a recorder. The video recording function may be a function of recording an image displayed on the television. In addition, an image capturing area extension function as a coalescing function may be implemented by combining plural cameras. The extension function is, for example, a function of capturing an image by linking the capturing areas of the respective cameras to each other. In addition, a translated call function (a function of translating a conversation via a telephone) as a coalescing function may be implemented by combining a telephone with a translator or translation software. As described above, the concept of the linkage function includes a function which may be implemented by linking identical types of devices or functions to each other, and a function which may be implemented by linking different types of devices or functions to each other.

The resource management information (e.g., the device function management information or the linkage function management information) will be described in detail later.

The controller 26 controls the operation of each unit of the terminal device 10. The controller 26 performs, for example, the control of a communication by the communication unit 18 and a control of information display on the display unit of the UI unit 20. Further, the controller 26 includes a specifying unit 28.

The specifying unit 28 has a function of receiving information indicating an instruction content input by the user (including information indicating a service content requested by the user and information indicating a resource designated by the user), and specifying a process corresponding to the instruction content or a resource candidate necessary for executing the process. The specifying unit 28 specifies the process corresponding to the instruction content or the resource candidate (e.g., a function or a device) by referring to, for example, the resource management information described above. The specifying unit 28 is implemented by, for example, the automatic response AI. In addition, the specifying unit 28 may be implemented by another program or the like rather than the automatic response AI.

Generally, a hierarchical structure is formed by a service, a device, a function, software, a specific operation content, and an operation target. For example, a service belongs to the highest level (highest concept). A device necessary for executing the service belongs to a lower level (subordinate concept) than the service. A function executed by the device or software operating on the device belongs to a lower level than the device. A specific operation content performed by using, for example, the device or software belongs to a lower level than the function. An operation target belongs to a lower level than the operation content. The operation target is, for example, a file.

For example, the instruction content input by the user has the hierarchical structure, and the specifying unit 28 analyzes the instruction content having the hierarchical structure, so as to specify a process corresponding to the instruction content or a resource candidate necessary for executing the process. For example, information indicating the instruction content includes information indicating a service requested by the user which is the information belonging to the highest level, and further, information indicating a file to be processed which is the information belonging to a lower level.

In addition, the automatic response AI notifies the user of questions having the hierarchical structure to obtain a hierarchical instruction content, and acquires the user's replies to the questions as the instruction content of the user. The specifying unit 28 analyzes the instruction content acquired as described above. For example, as for the questions having the hierarchical structure, the automatic response AI may notify the user of questions belonging to respective levels in descending order of level. In addition, when the user's reply to a question belonging to a specific level corresponds to a reply falling within a scope assumed for the question, the automatic response AI may provide the user with a question belonging to a lower level than the level of the previous question. In this way, the specific content of the process requested by the user may be narrowed down and easily specified. For example, replies falling within the assumed scope is determined in advance for each question, and the automatic response AI determines whether the user's actual reply is included in the assumed scope. When the user's actual reply is included in the assumed scope, the automatic response AI provides the user with a question belonging to a further lower level, and when the user's actual reply is not included in the assumed scope, the automatic response AI may provide the user with a question belonging to the same or higher level.

The process by the specifying unit 28 will be described in detail later. In addition, the process by the specifying unit 28 may be performed by an external device such as the server 16.

The controller 26 controls a notification (guidance) of information on a matter specified by the specifying unit 28 (e.g., information on a resource candidate). As the notification, the controller 26 may display information on a resource candidate on the display unit of the UI unit 20 or speak the information on the resource candidate as voice information by using, for example, a speaker. In addition, the controller 26 may control an execution of a process specified by the specifying unit 28.

In addition, the input of the instruction content by the user may be performed on the screen of the display unit of the UI unit 20 or may be performed by voice. For example, when an image associated with a resource (e.g., a device image associated with a device) is displayed on the screen of the UI unit 20, the user may designate the device image on the screen, such that an instruction content including the information indicating the device is input. As another example, the user may designate a resource by voice, regardless of whether an image associated with a resource is displayed on the screen of the UI unit 20. For example, when the user speaks a resource name (e.g., a device name) by voice, the voice is collected by the voice collecting unit such as a microphone, and voice information indicating the resource name is input to the terminal device 10. In this way, the input and notification of information may be performed by display on the screen or by voice. The display on the screen and the voice may be combined with each other.

Figure 3:
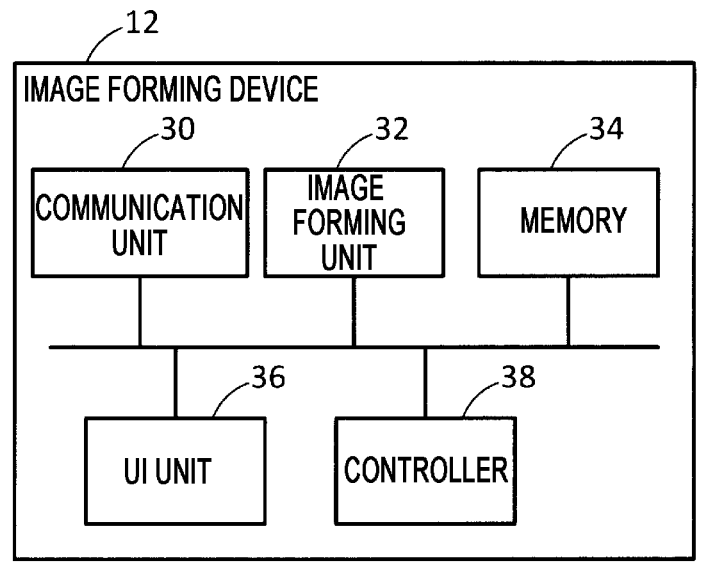
FIG. 3 is a block diagram illustrating a configuration of an image forming device.

Hereinafter, a configuration of the device 12 will be described in detail with reference to FIG. 3. For example, it is assumed that the device 12 is an image forming device. Hereinafter, the device 12 may be referred to as an image forming device 12. FIG. 3 illustrates a configuration of the image forming device 12.

A communication unit 30 is a communication interface and has a function of transmitting data to another device and a function of receiving data from another device. The communication unit 30 may be a communication interface having a wireless communication function or a communication interface having a wired communication function. For example, the communication unit 30 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi communication, or a near-field wireless communication. For example, the communication unit 30 may switch a communication method or a frequency band according to a communication partner or a surrounding environment.

An image forming unit 32 has an image forming function. Specifically, the image forming unit 32 has at least one of a scanning function, a printing function, a copying function, or a faxing function. When the scanning function is executed, a document is read, and scanned data (image data) is generated. When the printing function is executed, an image is printed on a recording medium such as a paper. When the copying function is executed, a document is read and printed on a recording medium. When the faxing function is executed, image data is transmitted or received by facsimile. In addition, a linkage function using plural functions may be executed. For example, a scanning transmitting function which is a combination of a scanning function and a transmitting function may be executed. When the scanning transmitting function is executed, a document is read so that scanned data (image data) is generated, and transmitted to a transmission destination (for example, an external device such as the terminal device 10). In addition, the linkage function is merely an example, and another linkage function may be executed.

A memory 34 is a storage device such as a hard disk or a memory (for example, an SSD). The memory 34 stores, for example, information indicating an instruction of image formation (for example, job information), image data to be printed, scanned data which is generated by executing the scanning function, device address information indicating an address of another device, information indicating an address of the terminal device 10 (terminal address information), server address information of the server 16, various control data, and various programs. These pieces of information may be stored in different storage devices or in a single storage device.

A UI unit 36 is a user interface unit including a display unit and an operation unit. The display unit is, for example, a display device such as a liquid crystal display. The operation unit is, for example, an input device such as a touch panel or a keyboard. In addition, the UI unit 36 may be a user interface serving as both the display unit and the operation unit (for example, a touch type display or a device of which display electronically displays a keyboard or the like). In addition, the image forming device 12 may not include the UI unit 36, and may include a hardware user interface unit (a hardware UI unit) having no display unit. The hardware UI unit is, for example, a hardware key specialized in input of numerals (for example, a numeric keypad) or a hardware key specialized in an indication of directions (for example, direction indication keys).

A controller 38 controls the operation of each unit of the image forming device 12.

Figure 4:
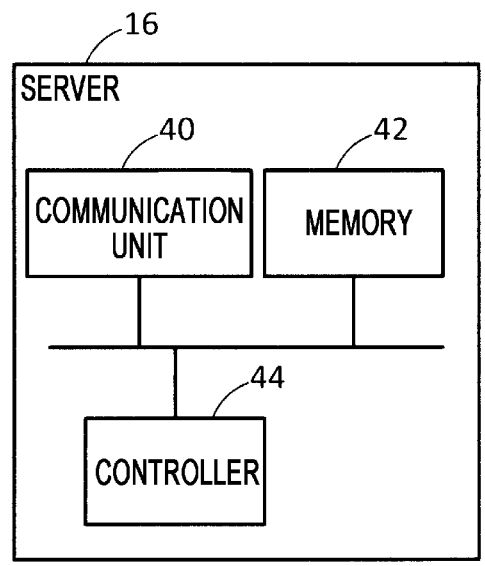
FIG. 4 is a block diagram illustrating a configuration of a server.

Hereinafter, a configuration of the server 16 will be described in detail with reference to FIG. 4. FIG. 4 illustrates a configuration of the server 16.

A communication unit 40 is a communication interface and has a function of transmitting data to another device and a function of receiving data from another device. The communication unit 40 may be a communication interface having a wireless communication function or a communication interface having a wired communication function.

A memory 42 is a storage device such as a hard disk or a memory (for example, an SSD). The memory 42 stores, for example, various data, various programs, address information of the terminal device 10, address information of each device, and server address information of the server 16. These pieces of information may be stored in different storage devices or in a single storage device. In addition, when the resource management information is managed by the server 16, the above-described device function management information and linkage function management information are stored in the memory 42, and the device function management information and the linkage function management information may be updated in the server 16. In addition, the device function management information and the linkage function management information (updated information when the information is updated) may be transmitted from the server 16 to the terminal device 10. The transmission may be performed periodically or at a designated timing. Accordingly, the information stored in the terminal device 10 is updated. When the resource management information is stored in the server 16, the resource management information may not be stored in the terminal device 10.

A controller 44 controls the operation of each unit of the server 16. The controller 44 controls, for example, the communication by the communication unit 40. In addition, the server 16 may include the specifying unit 28 and execute the process by the specifying unit 28. In this case, the terminal device 10 may not include the specifying unit 28.

As another example, the resource management information may be stored in the devices such as the devices 12 and 14, or the specifying unit 28 may be provided therein. That is, the process by the specifying unit 28 may be performed by the terminal device 10, the device such as the device 12 and 14, the server 16, or another device.

In the present exemplary embodiment, the device identification information is acquired and the device is identified by applying, for example, an augmented reality (AR) technique. For example, by applying the AR technique, device identification information of a device used alone is acquired so that the device is identified, and device identification information of devices to be linked is acquired so that the devices to be linked are identified. A known AR technique may be used as the AR technique. For example, a marker AR technique using a marker such as a two-dimensional barcode, a markerless AR technique using an image recognition technique, or a position information AR technique using position information is used. In addition, the device identification information may be acquired without using the AR technique so that a device is identified. For example, when a device is connected to a network, the device may be identified based on an IP address, or device ID may be read so that the device may be identified. In addition, when a device or a terminal device having various wireless communication functions such as an infrared communication, a visible light communication, Wi-Fi, and Bluetooth is used, device ID may be acquired by using the wireless communication functions so that the device is identified.

Figures 5, 6:
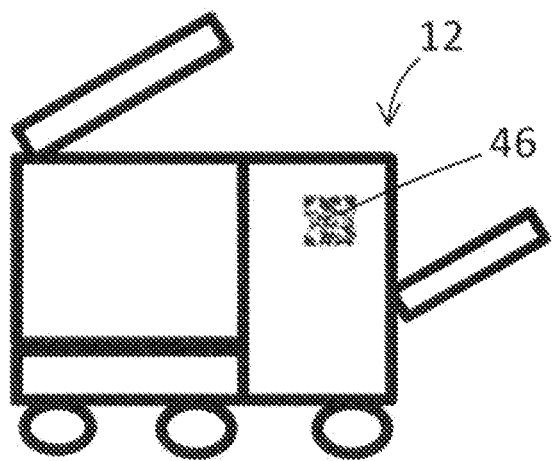
FIG. 5 is a schematic view illustrating the external appearance of the image forming device.
FIG. 6 is a view illustrating a device function management table.

Hereinafter, the process of acquiring device identification information will be described in detail with reference to FIG. 5. As an example, a case where device identification information of the image forming device 12 is acquired will be described. FIG. 5 schematically illustrates the external appearance of the image forming device 12. Here, the process of acquiring device identification information by applying the marker AR technique will be described. A marker 46 such as a two-dimensional barcode is provided on a casing of the image forming device 12. The marker 46 is information obtained by encoding device identification information of the image forming device 12. The user activates the camera 22 of the terminal device 10 and captures the marker 46 provided on the image forming device 12 to be used, using the camera 22. Accordingly, image data representing the marker 46 is generated. The controller 26 of the terminal device 10 extracts the device identification information by applying a decoding process to the marker image represented in the image data. Accordingly, the image forming device 12 to be used (the image forming device 12 having the captured marker 46) is identified. The specifying unit 28 of the terminal device 10 specifies function information indicating a function associated with the extracted device identification information, in the device function management information. Accordingly, the function that the image forming device 12 to be used has is specified (identified).

In addition, the controller 44 of the server 16 may extract the device identification information by applying the decoding process to the image data representing the marker 46. In this case, the image data is transmitted from the terminal device 10 to the server 16, and the decoding process is applied to the image data in the server 16. When the server 16 is provided with the specifying unit 28, the function associated with the device identification information may be specified in the server 16.

The function information indicating the function that the image forming device 12 has may be encoded and included in the marker 46. In this case, when the decoding process is applied to the image data representing the marker 46, the device identification information of the image forming device 12 is extracted, and the function information indicating the function that the image forming device 12 has is also extracted. Accordingly, the image forming device 12 is specified (identified), and the function that the image forming device 12 has is specified (identified). The decoding process may be performed by the terminal device 10 or the server 16.

In addition, device identification information of each of plural devices is acquired by capturing each marker in the plural devices.

For example, when device identification information is acquired by applying the markerless AR technique, the user captures the entire external appearance or a portion of the external appearance of a device to be used (for example, the image forming device 12), with the camera 22 of the terminal device 10. In order to acquire information for specifying a device to be used such as a name (for example, a product name), a model number, or an asset management number, it is helpful to capture the external appearance of the device. By the capturing, external appearance image data representing the entire external appearance or a portion of the external appearance of the device to be used is generated.

The controller 26 of the terminal device 10 identifies the device to be used based on the external appearance image data. For example, the memory 24 of the terminal device 10 stores external appearance image association information, for each device, indicating an association between external appearance image data representing the entire external appearance or a portion of the external appearance of the device and device identification information of the device. For example, the controller 26 compares the external appearance image data with each external appearance image data included in the external appearance image association information, and specifies the device identification information of the device to be used based on the comparison result. For example, the controller 26 extracts an external appearance feature of the device to be used from the acquired external appearance image data, specifies external appearance image data representing the same or similar external appearance feature as or to the extracted external appearance feature, in the external appearance image data group included in the external appearance image association information, and specifies device identification information associated with the external appearance image data. Accordingly, the device to be used (the device captured by the camera 22) is identified. As another example, when external appearance image data representing a name (for example, a product name) or a model number of the device to be used is generated by capturing the name or the model name, the device to be used may be identified based on the name or the model number represented in the external appearance image data. The specifying unit 28 of the terminal device 10 specifies function information indicating each function associated with the specified device identification information, in the device function management information. Accordingly, the function that the device to be used (for example, the image forming device 12) has is specified.

In addition, the controller 44 of the server 16 may compare the external appearance image data representing the entire external appearance or a portion of the external appearance of the device to be used (for example, the image forming device 12) with each appearance image data included in the external appearance image association information, and specify the device identification information of the device to be used based on the comparison result. The external appearance image association information is stored in the memory 42 of the server 16. In this case, the controller 44 of the server 16 specifies the device identification information of the device to be used, by referring to the external appearance image association information.

Device identification information of each of plural devices is acquired by capturing the entire external appearance or a portion of the external appearance of each device.

When device identification information is acquired by applying the position information AR technique, position information indicating a position where a device (for example, the image forming device 12) is installed is acquired by using, for example, a global positioning system (GPS) function. For example, each device has the GPS function and acquires device position information indicating a position of the own device. The terminal device 10 outputs information indicating a request for acquiring device position information to a device to be used, and receives the device position information of the device from the device as a response to the acquisition request. The controller 26 of the terminal device 10 identifies the device to be used based on the device position information. For example, the memory 24 of the terminal device 10 stores position association information, for each device, indicating an association between device position information indicating a position where a device is provided and device identification information of the device. The controller 26 specifies device identification information associated with the device position information in the position association information. Accordingly, the device to be used is specified (identified). The specifying unit 28 of the terminal device 10 specifies function information indicating each function associated with the specified device identification information, in the device function management information. As a result, the function that the device to be used (for example, the image forming device 12) has is specified (identified).

In addition, the controller 44 of the server 16 may specify the device identification information associated with the position information of the device to be used in the position association information. The position association information is stored in the memory 42 of the server 16. In this case, the controller 44 of the server 16 specifies the device identification information of the device to be used, by referring to the position association information.

Device position information of each of plural devices is acquired, and device identification information of each device is specified based on the device position information.

In addition, a device may be identified by using plural identification techniques. For example, a device may be identified by using plural techniques selected from the marker AR technique, the markerless AR technique, and the position information AR technique. In addition, when a device is not identified by a certain identification technique, the device may be identified by using another identification technique. For example, when a device is not identified by the marker AR technique or the markerless AR technique, the device may be identified by using the position information AR technique.

Hereinafter, the device system according to the present exemplary embodiment will be described in more detail.

The device function management information which is an example of the resource management information will be described in detail with reference to FIG. 6. FIG. 6 illustrates an example of a device function management table which is the device function management information. In the device function management table, for example, a device ID, information indicating a device name (for example, a device type), information indicating a function that a device has (function information), and an image ID are associated with each other. The device ID and the device name correspond to an example of the device identification information. The image ID is an example of image identification information for identifying a device image associated with a device. In addition, the device function management table may not include the image ID. For example, a device with the device ID "B" is a multifunction machine (an image forming device having plural image forming functions), and has functions such as the printing function and the scanning function. The device is associated with an image ID for identifying a device image associated with the device. For example, data of a device image associated with a device may be stored in the terminal device 10, the server 16, or another device.

For example, a device ID for identifying a device to be used is acquired by applying the AR technique. The specifying unit 28 of the terminal device 10 specifies the device name, the function, and the image ID which are associated with the device ID, by referring to the device function management table. Accordingly, the device to be used is identified. The information indicating the device name or the device image may be displayed on the display unit of the UI unit 20. In addition, an image itself captured by the camera 22 may be displayed on the display unit of the UI unit 20. In addition, when a device image associated with the device (for example, an image captured by the camera 22 or an image schematically representing the device) is designated by the user in the UI unit 20, information on a function that the device has (for example, function information or function explanation information) may be displayed on the display unit of the UI unit 20.

Hereinafter, the linkage function management information which is an example of the resource management information will be described in detail with reference to FIG. 7. FIG. 7 illustrates an example of a linkage function management table which is the linkage function management information. In the linkage function management table, for example, a combination of device IDs, information indicating a device name of each device to be linked (for example, types of respective devices), and information indicating a linkage function (linkage function information) are associated with each other. For example, a device with the device ID "A" is a personal computer (PC), and a device with the device ID "B" is a multifunction machine. When the PC A and the multifunction machine B are linked to each other, for example, the "scanning transmitting function" or the "printing function" is implemented as a linkage function. The "scanning transmitting function" is a function of transmitting image data generated by scanning by the multifunction machine B to the PC A. The "printing function" is a function of transmitting data (for example, image data or document data) saved in the PC A to the multifunction machine B and print the data by the multifunction machine B. In addition, a linkage function executable by using three or more devices may be set. In this case, a combination of the three or more devices and a linkage function are associated with each other, and the association is registered in the linkage function management table.

The resource management information is not limited to the above-described device function management information and linkage function management information. For example, different functions may be assigned to respective portions in a device image associated with a device, and the resource management information may be information for managing functions assigned to the respective portions (portion management information).

Hereinafter, the portion management information which is an example of the resource management information will be described in detail with reference to FIG. 8. FIG. 8 illustrates an example of a portion management table which is the portion management information. In the portion management table, as an example, a device ID, information indicating a device name (e.g., a device type), information indicating a position in a device image (position of the portion), information indicating a function corresponding to the portion in the device image (function information), and an image ID are associated with each other. The position in a device image is a specific position (a specific portion) in a device image associated with a device and is, for example, a specific position in a device image schematically representing a device or a specific position in a device image captured by the camera. The respective specific positions (portions) in a device image are associated with different functions.

FIG. 9 illustrates another example of the portion management table. In the portion management table, as an example, a device ID, information indicating a device name (e.g., a device type), information indicating a name of a portion of the device (e.g., a type of the portion), a portion ID which is portion identification information for identifying the portion, information indicating a function assigned to the portion (a function that the portion has), and a portion image ID for identifying the portion image associated with the portion are associated with each other. The portion image represents the external appearance of a portion of a device obtained by capturing with the camera. In addition, a portion image schematically representing a portion of a device may be associated with the portion. For example, different functions are assigned to respective portions of a device.

As a specific example, the screen displaying function is assigned to the display portion of the PC A, and information indicating the screen displaying function is associated with the portion image ID of the portion image associated with the display portion. The screen displaying function is a function of displaying information by the PC A. The data saving function is assigned to the main body portion of the PC A, and information indicating the data saving function is associated with the portion image ID of the portion image associated with the main body portion. The data saving function is a function of saving data in the PC A.

In addition, the printing function is assigned to the main body portion of the multifunction machine B, and information indicating the printing function is associated with the portion image ID of the portion image associated with the main body. The scanning function is assigned to the reading unit of the multifunction machine B (for example, the portion associated with the document cover, the document glass, or the automatic document feeder of the multifunction machine B), and information indicating the scanning function is associated with the portion image ID of the portion image associated with the reading portion. The stapling function is assigned to the post-processing device of the multifunction machine B, and information indicating the stapling function is associated with the portion image ID of the portion image associated with the post-processing device. The stapling function is a function of binding output papers with a staple.

The functions assigned to the portions of the devices are specified (identified) by using the markerless AR technique. For example, when a portion of a device is captured by a camera (e.g., the camera 22 of the terminal device 10), the specifying unit 28 specifies (identifies) a function associated with the external appearance image data in the portion management table illustrated in FIG. 9. Accordingly, the function assigned to the captured portion is specified (identified). For example, when the main body portion of the multifunction machine B is captured by the camera 22, the specifying unit 28 specifies the printing function associated with the external appearance image data representing the main body portion of the multifunction machine B in the portion management table. Accordingly, the printing function assigned to the main body portion of the multifunction machine B is specified.

In addition, the functions assigned to the portions of the devices may be specified (identified) by using the marker AR technique. For example, each portion of a device is provided with a marker such as a two-dimensional barcode obtained by encoding portion identification information for identifying the portion (for example, the portion ID). When the marker provided in the portion is captured by a camera and the marker AR technique is applied, the portion identification information (for example, the portion ID) of the portion is acquired. As described above, when the portion identification information is acquired, the specifying unit 28 specifies (identifies) a function associated with the portion identification information (e.g., the portion ID) in the portion management table illustrated in FIG. 9.

FIG. 10 illustrates an example of the linkage function management table for managing a linkage function executable by using portions of devices. The linkage function management table is information indicating a linkage function using functions that plural portions have. In the linkage function management table, for example, information indicating a combination of portions of devices, information indicating a combination of portion IDs, and information indicating a linkage function executable by using functions that the plural portions included in the combination have are associated with each other. In addition, in the linkage function management table, information indicating a combination of a portion of a device and an entire device and information indicating a linkage function using a function that the portion of the device has and a function that the entire device has may be associated with each other.

As a specific example, the "printing function" is assigned as a linkage function to a combination of the display unit of the PC A and the main body portion of the multifunction machine B. The "printing function" which is a linkage function is a function of transmitting data saved in the PC A to the multifunction machine B and print the data by the multifunction machine B.

Further, the "printing function" is assigned as a linkage function to a combination of the main body portion of the multifunction machine B and the main body portion of the projector C. The "printing function" which is a linkage function is a function of transmitting data projected by the projector C to the multifunction machine B and print the data by the multifunction machine B.

Further, a "scanning projecting function" is assigned as a linkage function to a combination of the reading unit of the multifunction machine B and the main body portion of the projector C. The "scanning projecting function" which is a linkage function is, for example, a function of transmitting data generated by scanning by the multifunction machine B to the projector C and project the data by the projector C.

In addition, the linkage function may be a function executable by using functions that plural portions included in the same device have, or a function executable by using functions that portions of plural different devices have. In addition, the linkage function may be a function executable by using functions that three or more portions have.

FIG. 11 illustrates another linkage function management table. The linkage function management table is information indicating a linkage function executable by using plural functions. In the linkage function management table, for example, a function ID (for example, an ID for identifying software), information indicating a function name (for example, a software name), and information indicating a linkage function executable by using plural functions are associated with each other. A linkage function executable by using plural functions is specified by referring to the linkage function management table.

For example, software α as a function is software for transmitting data, and software β as a function is software for setting a password for data. For example, a linkage function of setting a password for data and then transmitting the data is implemented by combining the software α and the software β. Executable linkage functions are also set for other pieces of software.

In addition, a linkage function executable by using three or more functions (for example, pieces of software) may be set. In this case, the combination of the three or more functions and the linkage function are associated with each other, and the association is registered in the linkage function management table.

The linkage function may be a function executed by using a device and a function. FIG. 12 illustrates a table for managing a linkage function executable by using a device and a function. The linkage function management table is information indicating a linkage function executable by using a device and a function (for example, software). In the linkage function management table, for example, a combination of IDs (a combination of a device ID and a function ID), information indicating a device name and a function name, and a linkage function executable by using a device and a function are associated with each other. A linkage function executable by using a device and a function is specified by referring to the linkage function management table. For example, a linkage function of transmitting data by using the PC A is implemented by combining the PC A which is a device A and the data transmitting function which is a function α. Similarly, executable linkage functions are also set for other devices and other functions. In addition, a linkage function executable by using a total of three or more devices and functions may be set. In this case, the combination of the total three or more devices and functions and a linkage function are associated with each other, and the association is registered in the linkage function management table.

FIG. 13 illustrates further another linkage function management table. This linkage function management table is a table for managing a linkage function which is executed on plural files (data). The linkage function may be a function executable by using plural devices, a function executable by using plural pieces of software, or a function executable by using a function that a device has as hardware and a function implemented by software. For example, each file is associated with software (application) that executes a process on the file, and the linkage function is implemented by linking applications associated with plural files, respectively, selected by the user to each other.

The files are, for example, a document file, an image file, a video file, a spreadsheet file, a presentation file, a graphic (drawing) file, and an audio file.

The document file is a file having a document format and is configured with character strings or other pieces of information. The document file may contain images, tables, or figures as other pieces of information. The document format is, for example, a text format or a document format. The document file corresponds to, for example, data having a text format (for example, data appended with a character string ".txt" as an extension) or data having a document format (for example, data appended with a character string ".doc" or ".docx" as an extension).

The image file is a file having an image format. The image file may be image data having a raster format or image data having a vector format. The image format is, for example, a JPEG format, a BMP (bitmap) format, a PDF format, a GIF format, a TIFF format, or a PICT format. The image file corresponds to, for example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), or data having a PICT format (data appended with a character string ".pict" as an extension). In addition, an image file having a format other than the formats described above may be used.

The video file is a file having a video format. The video format is, for example, an AVI format, an MP4 format, an MOV format, an MPEG2-TS format, an MPEG2-PS format, a WMV format, or an FLV format. The video file corresponds to, for example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), or data having an FLV format (data appended with a character string ".flv"). In addition, a video file having a format other than the formats described above may be used.

The spreadsheet file is a file having a table format and is configured with tables, graphs, or other pieces of information. The spreadsheet file may contain character strings, images, or figures as other pieces of information. For example, the spreadsheet file is data appended with a character string ".csv," ".xls" or ".xlsx" as an extension.

The presentation file is a file having a presentation sheet format. For example, the presentation file corresponds to data appended with a character string ".ppt" or ".pptx" as an extension. The presentation file is configured with, for example, character strings, images (still images or video), figures, and voice.

The graphic file is a file having a graphic (drawing) format. The graphic file is created by, for example, graphic generating software (for example, two-dimensional CAD or three-dimensional CAD). For example, the graphic file corresponds to data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (for example, a WAV format, an AIFF format, or a BWF format), an irreversible compressed audio format (for example, an mp3 format, an AAC format, or a WMA format), or a reversible compressed audio format (for example, a TAK format or an FLAC format). For example, the audio file corresponds to data having an uncompressed audio format (data appended with, for example, a character string ".wav" as an extension), data having an irreversible compressed audio format (data appended with, for example, a character string ".mp3" as extension), or data having an uncompressed audio format (data appended with, for example, a character string ".tak" as an extension).

The linkage functions registered in the linkage function management table illustrated in FIG. 13 are determined according to each file format (attribute), and in the linkage function management table, for example, information indicating a combination of plural file formats and information indicating a linkage function (linkage function information) are associated with each other. The linkage function information is, for example, a linkage function ID or a linkage function name. The file format is, for example, the above-described document format, image format, video format, table format, sheet format, graphic format, or audio format. A linkage function associated with the combination of the plural file formats is specified (identified) by referring to the linkage function management information. In addition, while FIG. 13 illustrates a combination of two file formats, an association between a combination of three or more file formats and a linkage function may be registered in the linkage function management table.

The linkage function may be a function implemented by linking plural different functions (for example, different pieces of software) to each other or a function implemented by linking identical functions (for example, identical pieces of software) to each other. The linkage function may be a function which is unusable before the linkage. A function which is unusable before linkage may become usable by linking identical functions to each other, or become usable by combining different functions to each other. For example, when a document creating function (document creating software) and an image displaying function (image displaying software (for example, an image viewer)) are linked to each other, a function of inserting (attaching) an image into a document or a function of superimposing a document (a character string or a text) on an image is implemented as a linkage function. That is, when the document creating function and the image displaying function are linked to each other, an image inserting function or a text superimposing function is implemented.

The concept of the linkage function may include a coalescing function executable as a new function by combining plural functions with each other. For example, an extended displaying function may be implemented as the coalescing function by combining plural displaying functions. In addition, a capturing area expanding function may be implemented as the coalescing function by combining plural capturing functions. In addition, a translated call function (a function of translating a phone conversation) may be implemented as the coalescing function by combining a call function and a translation function. As described above, the concept of the linkage function may include a function which may be implemented by linking identical types of functions to each other, or a function which may be implemented by linking different types of functions to each other.

Each linkage function registered in the linkage function management table illustrated in FIG. 13 may be a function executable by software installed in the terminal device 10, a function executable by software installed in an external device (e.g., a server or another terminal device), or a function executable by software installed in the terminal device 10 and software installed in an external device.

Hereinafter, each linkage function illustrated in FIG. 13 will be described.

In FIG. 13, the "document format" is a text format (having an extension of ".txt") or a document format (having an extension of ".doc" or ".docx"). The "table format" is a format with an extension expressed as, for example, ".csv" or ".xls." The "image format" is a format with an extension expressed as, for example, ".jpeg" or ".pdf." The "video format" is a format with an extension expressed as, for example, ".avi" or ".mpeg." The "sheet format" is a format with an extension expressed as, for example, ".ppt." While FIG. 33 does not illustrate the graphic format or the audio format, an association between a combination of file formats including the graphic format and the audio format and a linkage function may be registered in the linkage function management table. In addition, an association between a combination of file formats other than the file formats illustrated in FIG. 13 and a linkage function may be set and registered in the linkage function management table.

For example, when the user designates a document file A and a spreadsheet file B as resources, a "function of inserting a table into a document" and a "function of inserting a document into a table" which are associated with the combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When the user designates the document file A and an image file C as resources, a "function of inserting an image into a document" and a "function of superimposing a document on an image" which are associated with the combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When the user designates the document file A and a video file D as resources, a "function of inserting a video into a document" and a "function of inserting a still image into a document" which are associated with the combination of the document format and the video format are specified as linkage functions. The "function of inserting a video into a document" is a function of inserting the video represented by the video file D into the document represented by the document file A. The "function of inserting a still image into a document" is a function of inserting one or more frames (still images) included in the video file D into the document represented by the document file A. For example, when the document file A is a document file which is not compatible with a video, that is, a file into which a video cannot be inserted and when the "function of inserting a still image into a document" is executed, one or more frames (still images) included in the video file D are inserted into the document represented by the document file A.

Plural files having the same file format may be selected by the user. For example, when the user designates document files A1 and A2 as resources, a "function of integrating documents with each other" which is associated with the combination of the document formats is specified as a linkage function. The "function of integrating documents" is a function of integrating the documents represented by the document files A1 and A2 with each other (for example, combining the two documents with each other), and generates a new document file A3 while saving or removing the document files A1 and A2.

When the user designates spreadsheet files B1 and B2 as resources, a "function of integrating tables with each other" which is associated with the combination of the table formats is specified as a linkage function. The "function of integrating tables" is a function of integrating the tables represented by the spreadsheet files B1 and B2 with each other (for example, combining the two tables with each other), and generates a new spreadsheet file B3 while saving or removing the spreadsheet files B1 and B2.

When the user designates video files D1 and D2 as resources, a "function of integrating videos with each other" which is associated with the combination of the video formats is specified as a linkage function. The "function of integrating videos" is a function of integrating the videos represented by the video files D1 and D2 with each other (for example, combining the two videos with each other), and generates a new video file D3 while saving or removing the video files D1 and D2.

In addition, when the user designates a presentation file E and the document file A as resources, a "function of inserting a document into a presentation sheet" which is associated with the combination of the sheet format and the document format is specified as a linkage function. The "function of inserting a document into a presentation sheet" is a function of inserting the document represented by the document file A into the sheet represented by the presentation file E.

In addition, the combination of the objects to be linked is not limited to the combinations described above. For example, when a combination of at least two of a device, a function (including a function executed by a device and a function executed by software), a file, or software is selected as a combination of objects to be linked, a notification of a linkage function executable by using the combination may be controlled. For example, when the user designates a device and a file as resources, the specifying unit 28 may specify a linkage function executable by using the device and the file. As a specific example, when the multifunction machine B and a document file are designated as resources, the specifying unit 28 specifies a linkage function executable by using the multifunction machine B and the document file (e.g., a function of printing the document file by the multifunction machine B or a function of faxing the document file by the multifunction machine B). Similarly, when software and a file are designated as resources, the specifying unit 28 may specify a linkage function executable by using the function implemented by the software and the file. As a specific example, when a document application and a document file are designated as resources, the specifying unit 28 specifies a linkage function executable by using the document application and the document file (e.g., a function of editing or outputting the document file by the document application). In addition, when a device, a function, and a file are designated as resources, the specifying unit 28 may specify a linkage function executable by using the device, the function (e.g., software), and the file. As a specific example, when the multifunction machine B, a document application, and a document file are designated as resources, the specifying unit 28 specifies a linkage function executable by using the multifunction machine B, the document application, and the document file (e.g., a function of editing the document file by the document application, outputting the edited document file to the multifunction machine B, and printing or faxing the document file by the multifunction machine B). In the specific examples described above, the combinations are merely examples. A linkage function executable by any combination of a device, a function, a file, and software other than the combinations described above may be set.

Hereinafter, the operation of the terminal device 10 will be described in detail by using specific examples.

Specific Example 1

Figure 14:
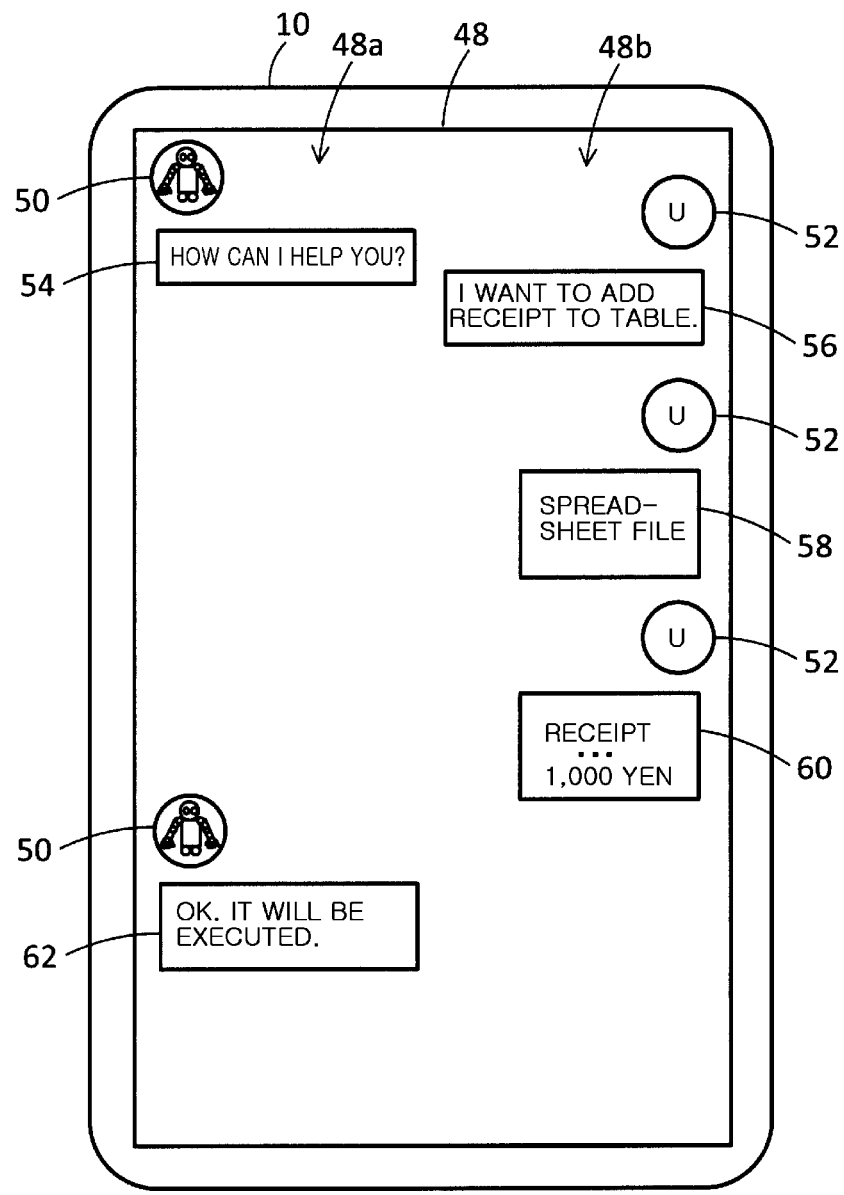
FIG. 14 is a view illustrates a screen.

Specific Example 1 will be described with reference to FIG. 14. FIG. 14 illustrates an example of a screen displayed on the terminal device 10. The controller 26 of the terminal device 10 displays a screen 48 on the display unit of the UI unit 20 to and displays various pieces of information of the screen 48. The screen 48 is an interface (an interaction response screen) on which the user makes a conversation with the automatic response AI. The screen 48 displays information (for example, a character string or an image)

input by the user to the terminal device 10, and information (for example, a character string or an image) indicating a message content of the automatic response AI. The conversation between the user and the automatic response AI may be a so-called chatting type conversation (that is, a real-time conversation. In further other words, a conversation conducted in the manner that the user and the automatic response AI post messages to each other). For example, when a program for making a conversation with the automatic response AI (for example, a chatting program) is executed, the screen 48 for the conversation (the interaction response screen) is displayed on the display unit of the UI unit 20.

A display area for each party making a conversation may be provided on the screen 48, and a message content of each conversation participant making a conversation may be displayed in the own display area. For example, a display area 48a is an area that displays a message content of the automatic response AI, and a display area 48b displays a message content of the user (information input by the user to the terminal device 10). In the example illustrated in FIG. 14, a display area 48a for the automatic response AI is provided on the left side in the direction facing the screen 48, and a display area 48b for the user is provided on the right side. In addition, the example of the display is merely an example. The arrangement relationship of the display areas may be reversed, the respective display areas may be provided vertically, the respective display areas may entirely or partially overlap with each other, or a specific area of the screen 48 (for example, the center area) may display the latest message content, and the periphery of the specific area may display past message contents. In addition, the respective display areas may have the same size or different sizes from each other, or the size of each display area may be expanded or reduced according to an amount of message contents for each message or the number of times a message is made. The controller 26 performs the control of the setting or size of each display area.

In the example illustrated in FIG. 14, the conversation participants making a conversation are one user and one automatic response AI. However, plural users or plural automatic response AIs may join the conversation. In this case, a display area for each conversation participant making a conversation may be provided on the screen 48. For example, when two users and one automatic response AI join the conversation, three display areas are provided on the screen 48, and a message content of each conversation participant making a conversation is displayed in the own display area. For example, when plural users conduct a conversation with each other via the screen 48 by conducting a communication among plural terminal devices 10, message contents of the plural users are displayed on the screen 48. This display is identically applied to the case where plural automatic response AIs join the conversation. Programs for plural automatic response AIs may be installed in the same terminal device 10 such that the plural automatic response AIs are stored in the same terminal device 10, or programs for a plural automatic response AIs may be installed in different terminal devices 10 such that the automatic response AIs are stored in the different terminal devices 10, respectively. For example, the screen 48 displays a message content of the automatic response AI stored in the own terminal device 10, and further, message contents of the automatic response AIs stored in other terminal devices 10. The automatic response AIs stored in the other terminal devices 10 join the conversation via, for example, the communication path N.

For example, when a chatting program is activated, the controller 26 of the terminal device 10 displays the screen 48 on the display unit of the UI unit 20. An image 50 associated with the automatic response AI is displayed in the display area 48a for the automatic response AI, and an image 52 associated with the user is displayed in the display area 48b for the user. The image 50 identifies the automatic response AI, and the image 52 identifies the user. In addition, a character string indicating the automatic response AI (a character string for identifying the automatic response AI) may be displayed in place of or along with the image 50. Similarly, a character string indicating the user (for example, a character string for identifying the user such as a name, a user ID, a handle name, or a nickname) may be displayed in place of or along with the image 52.

Then, a conversation is conducted between the user and the automatic response AI. In the conversation, the message content of the user may be input to the terminal device 10 in the manner that the user inputs information such as a character string or an image by operating the UI unit 20, or may be input by voice. In addition, the message content of the user may or may not be displayed as information such as a character string or an image on the screen 48. Similarly, the message content of the automatic response AI may be displayed as information such as a character string or an image on the screen 48, or may be or may not be displayed on the screen 48 along with output by voice. Hereinafter, for example, descriptions will be made by assuming that a message content of each conversation participant making a conversation is displayed on the screen 48. However, the message content may be output by voice.

In addition, when a conversation is conducted on the screen 48, the screen 48 is scrolled so that past message contents which may not be displayed on the screen 48 disappear from the screen 48, and the latest message content and nearby message contents thereof are displayed on the screen 48.

When a chatting program is started, first, the automatic response AI makes a common question (a question asking about a user's request) such as "How can I help you?," and a character string indicating the question is displayed as a message content 54 of the automatic response AI in the display area 48a. In addition, the message content of the automatic response AI may be output by voice in place of or along with the character string. Since the message content is one made by the automatic response AI, the controller 26 display the message content in the display area 48a as a message content associated with the image 50 of the automatic response AI. The same is applied to subsequent conversations.

In response to the message content 54, the user inputs information indicating a content of a service or information indicating a resource to be used for the service to the terminal device 10. For example, when the user makes a message of "I want to add a receipt to a table," the message is displayed as a message content 56 in the display area 48b. For example, the user may input information indicating the message content to the terminal device 10 by inputting a character string by operating the screen 48, or may input the information indicating the message content to the terminal device 10 by voice. Since the message content is made by the user, the controller 26 displays the message content 56 in the display area 48b as a message content associated with the image 52 of the user. The same is applied to subsequent conversations.

The information included in the message content 56 is information indicating the service requested by the user and belonging to the highest level among the information included in the instruction content of the user. The controller 26 transmits the message content 56 as the instruction content of the user to the automatic response AI. The automatic response AI analyzes the message content 56 of the user and identifies the service requested by the user.

Next, the user inputs information indicating a resource belonging to the lower level (a resource to be used for the service) than the level to which the service belongs, to the terminal device 10. In the example illustrated in FIG. 14, the information of the spreadsheet file A having the table format is input by a message content 58 of the user to the terminal device 10, and subsequent to the message content 58, the information of the image file B having the image format is input by a message content 60 to the terminal device 10. The spreadsheet file A and the image file B correspond to an example of resources to be used for the service, and are information belonging to the lower level than the level to which the service belongs. The information of the spreadsheet file A is identification information for identifying the spreadsheet file A and may be, for example, a file image associated with the spreadsheet file A or text information or voice information indicating the identification information (e.g., a file name). Similarly, the information of the image file B is identification information for identifying the image file B and may be, for example, a file image associated with the image file B or text information or voice information indicating the identification information (e.g., a file name). The controller 26 transmits the message contents 58 and 60 as the instruction content of the user to the automatic response AI.

In the example illustrated in FIG. 14, the file image associated with the spreadsheet file A is input as the information of the spreadsheet file A, and the file image associated with the image file B is input as the information of the image file B.

For example, the controller 26 displays a stock area in the display area 48*b* for the user, and displays file images in the stock area. For example, the controller 26 displays file images associated with files stored in the terminal device 10 in the stock area. As for files stored in an external device such as the server 16, the controller 26 may display file images associated with files usable by the user in the stock area. When there exists a file image that cannot be displayed in the stock area, the file image is displayed in the stock area in the manner that the user performs an operation to scroll the file images displayed in the stock area.

The user may select a file image associated with the file as a resource from the stock area, move the file image to the outside of the stock area, and transmit the file image as a message content of the user to the automatic response AI. For example, the user moves the file image from the stock area to the position where a message content of the user is displayed, by performing a dragging operation, and performs a dropping operation at the position where the message content is displayed. With the operations, the controller 26 transmits the file image as a message content of the user to the automatic response AI. For example, when the user selects and takes an image (the file image in the example described above) out of the stock area by using a pointer (e.g., the user's finger, a pen, or a stylus) on the screen 48, the image is included in a message content of the user and transmitted to the automatic response AI. The controller 26 detects the movement of the pointer on the screen 48 by detecting the contact of the pointer with the screen 48.

The specifying unit 28 (the specifying unit 28 implemented by the automatic response AI) analyzes the message content 58 and identifies the spreadsheet file A as a resource to be used for the service. Similarly, the specifying unit 28 analyzes the message content 60 and identifies the image file B as a resource to be used for the service.

The specifying unit 28 analyzes the instruction content of the user, so as to identify the process corresponding to the instruction content and specify the resource candidates necessary for executing the process. In the example described above, the service for "adding a receipt to a table" which belongs to the highest level is identified, and further, the resources of "spreadsheet file A and image file B" which belong to the lower level are identified. In this case, the specifying unit 28 identifies a specific process content for "adding the image file B to the spreadsheet file A," and specifies a function necessary for executing the process content as a resource candidate. By referring to, for example, the linkage function management table illustrated in FIG. 13, the specifying unit 28 specifies a linkage function associated with the combination of the table format and the image format (e.g., a linkage function of inserting an image file into a spreadsheet file) as a resource candidate necessary for executing the process described above. In addition, the specifying unit 28 may analyze the image file B itself and identify that the image file B is an image representing a receipt.

When the linkage function is specified as a resource candidate as described above, the controller 26 may display the information on the linkage function in the display area 48*a* as a message content of the automatic response AI. For example, when plural linkage functions are specified, the controller 26 displays the information on the plural linkage functions in the display area 48*a* as a message content of the automatic response AI. The controller 26 controls an execution of a linkage function selected by the user from the plural linkage functions. For example, when the user instructs the execution of the linkage function, the controller 26 displays information indicating that the linkage function is to be executed, in the display area 48*a* as a message content 62 of the automatic response AI.

In addition, when plural resource candidates are not specified, the controller 26 may control an execution of a linkage function specified by the specifying unit 28. In the example described above, since the process of "adding the image file B to the spreadsheet file A" is specified, the controller 26 may control the execution of the process. In this case, the controller 26 starts an image application and a spreadsheet application so as to copy the image file B by using the image application and paste the image file B into the spreadsheet file A by using the spreadsheet application. In this way, the image file B is added to the spreadsheet file A.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

When the specific process content is not specified by the specifying unit 28, the automatic response AI creates a question for specifying a process content. The controller 26 displays the question in the display area 48*a* as a message content of the automatic response AI.

The automatic response AI may create questions having the hierarchical structure and notify the questions to the user, so as to obtain an instruction content having the hierarchical structure from the user. In this case, the automatic response AI notifies the user of a question belonging to each level in descending order of level.

First, the automatic response AI makes a question to inquire about a content of a service requested by the user as a question belonging to the highest level. The controller 26 displays, for example, a message content of "What service do you want?" that is a message content for inquiring about a content of a service, in the display area 48*a* as a message content of the automatic response AI. When the user inputs a message content indicating a service in response to the question (message content), the automatic response AI analyzes the message content and identifies the content of the service requested by the user.

The automatic response AI determines whether the user's reply (message content) to the question belonging to the highest level corresponds to the reply falling within the scope assumed for the question. Replies falling within an assumed scope is determined in advance for a question of each level, and the automatic response AI determines whether the user's actual reply is included in the assumed scope. For example, when the user inputs a message content indicating a content of a service in response to the message content of the automatic response AI for inquiring about a content of a service, the automatic response AI determines that the user's reply is included in the assumed scope. Meanwhile, when the user inputs a message content indicating contents other than the service, the automatic response AI determines that the user's reply is not included in the assumed scope.

When the user's actual reply to the question belonging to the highest level corresponds to the reply falling within the scope assumed for the question, the automatic response AI notifies the user of a question belonging to the lower level than the highest level (e.g., a question belonging to a middle level). The controller 26 displays the question belonging to the lower level in the display area 48*a* as a message content of the automatic response AI. Meanwhile, when the user's actual reply is not included in the assumed scope, the automatic response AI notifies the user of the question belonging to the highest level again. The controller 26 displays the question belonging to the highest level again in the display area 48*a* as a message content of the automatic response AI.

When the user inputs a reply as a message content in response to the question (message content) belonging to the lower level than the highest level, the automatic response AI determines whether the user's actual reply corresponds to the reply falling within the scope assumed for the question. For example, a question inquiring about a resource to be used for the service corresponds to the question belonging to the lower level than the highest level, and the controller 26 displays the question in the display area 48*a* as a message content of the automatic response AI. When the user inputs a message content indicating a resource to be used for the service in response to the question (message content), the automatic response AI determines that the user's reply is included in the assumed scope. In this case, the automatic response AI creates a question belonging to the further lower level in order to specify a specific process content, and controller 26 displays the question in the display area 48*a* as a message content of the automatic response AI. In addition, when the specific process content is specified by the specifying unit 28 at this stage, the controller 26 may notify the user of the specific process content or a resource candidate necessary for executing the process (e.g., a candidate of a linkage function). Meanwhile, when the user inputs a message content indicating contents other than a resource, the automatic response AI determines that the user's reply is not included in the assumed scope. In this case, the automatic response AI notifies the user of a question belonging to the same or higher level. The controller 26 displays the question belonging to the same or higher level in the display area 48*a* as a message content of the automatic response AI. Then, questions having the hierarchical structure are notified to the user as a message content of the automatic response AI until the specifying unit 28 specifies a specific process content based on the instruction content of the user. By notifying the user of questions having the hierarchical structure, the specific content of the process requested by the user is narrowed down and easily specified.

In the example illustrated in FIG. 14, as the user's reply to the question belonging to the highest level, the message content 56 of "I want to add a receipt to a table" is input by the user. Since the message content 56 indicates the content of the service, the automatic response AI determines that the user's reply is included in the assumed scope. In this case, the automatic response AI creates a question for specifying specific resources to be used for the service, as a question belonging to the lower level than the highest level. In order to execute the service for "adding a receipt to a table," it is necessary to specify a specific "table" or "receipt," and thus, the automatic response AI creates a question for specifying the specific "table" or "receipt." The controller 26 displays the question in the display area 48*a* as a message content of the automatic response AI. For example, in order to specify the specific "table," the automatic response AI creates a message content of "Which spreadsheet file do you want to use?," or in order to specify the specific "receipt," the automatic response AI creates a message content of "Which receipt do you want to use?." Such message contents are displayed as message contents of the automatic response AI in the display area 48*a*. In the example illustrated in FIG. 14, as for the user's reply to the questions belonging to the lower level, information for specifying the specific "table" (information of the spreadsheet file A) is input by the user as the message content 58, and information for specifying the specific "receipt" (information of the image file B) is input by the user as the message content 60. Since the message contents 58 and 60 indicate the resources to be used for the service, the automatic response AI determines that each of the user's replies is included in the assumed scope. When the specific process content is specified by the specifying unit 28 at this stage, the controller 26 notifies the user of information indicating a resource candidate necessary for executing the process content (e.g., a candidate of a linkage function). In the example illustrated in FIG. 14, the user first inputs the information indicating the content of the service belonging to the highest concept, and subsequently, inputs the information indicating the resources belonging to the lower concept (e.g., files), so that the specific process content is gradually specified.

The specifying unit 28 may specify an executable process content and a resource candidate necessary for executing the process content (e.g., a candidate of a linkage function), based on information input by the user within a time limit. A starting time point of the time limit may be, for example, a time point when the automatic response AI makes a question to the user as in the message content 54, or a time point when the user inputs the first message content 56 after the message content 54 is made. When the time limit is used as well, questions having the hierarchical structure are notified to the user.

For example, it is assumed that under a circumstance where the content of the service indicated by the message content 56 is not precisely identified by and is unclear to the automatic response AI, the user inputs the message contents 58 and 60 within the time limit, and the contents indicated by the message contents 58 and 60 are precisely identified by the automatic response AI. In this case, the specifying unit 28 specifies linkage functions associated with the combination of the spreadsheet file A indicated by the message content 58 and the image file B indicated by the message content 60 in the linkage function management table illustrated in FIG. 13, as resource candidates necessary for executing the process content. For example, it is assumed that a function of "inserting an image into a table" and a function of "superimposing a table on an image" are specified as the linkage functions. In this case, the specifying unit 28 specifies "inserting the image file B into the spreadsheet file A" and "superimposing the spreadsheet file A on the image file B" as executable process contents. The controller 26 displays the information on the process content and the linkage functions specified by the specifying unit 28 in the display area 48a as a message content of the automatic response AI. For example, the information on the function "to insert an image into a table" and the information on the function "to superimpose a table on an image" are displayed as resource candidates necessary for executing the service in the display area 48a. When the user designates a linkage function and gives an execution instruction, the controller 26 controls the execution of the linkage function designated by the user.

The specifying unit 28 may specify an executable process content and a resource candidate (e.g., a candidate of a linkage function) necessary for executing the process content, based on user's replies obtained in response to a predetermined number of questions. In this case as well, questions having the hierarchical structure are notified to the user.

When the user inputs information belonging to the predetermined number of levels among the plural levels constituting the instruction content, the specifying unit 28 may specify an executable process content and a resource candidate necessary for executing the process content (e.g., a candidate of a linkage function) based on the input information. For example, when the user inputs information belonging to the highest level, information belonging to the middle level, and information belonging to the lower level, the specifying unit 28 specifies an executable process content and a resource candidate necessary for executing the process content based on the input information.

As a specific example, it is assumed that the user inputs a message content indicating a content of a service (e.g., the message content of "I want to add a receipt to a table") as the information belonging to the highest level, inputs a message content indicating a device (e.g., a message content of "I want to use the PC A") as the information belonging to the middle level, and inputs a message content indicating a file (e.g., a message content of "spreadsheet file A and image file B") as the information belonging to the lower level. In this case, the specifying unit 28 specifies the process content for "inserting the image file B into the spreadsheet file A by using the PC A," and specifies the linkage function of "inserting an image into a spreadsheet" as a resource candidate necessary for executing the process content.

In addition, when information of plural pieces of data which are different in format from each other is input as a message content of the user and transmitted to the automatic response AI, the specifying unit 28 may specify a linkage function executable by using the plural pieces of data, by referring to the linkage function management table illustrated in FIG. 13. In this case, the controller 26 displays the information on the linkage function specified by the specifying unit 28 in the display area 48a as a message content of the automatic response AI. In the example illustrated in FIG. 14, the spreadsheet file A input by the message content 58 is data having the table format, and the image file B input by the message content 60 is data having the image format. Since the information of the data having the table format and the information of the data having the image format are input, the specifying unit 28 specifies a linkage function associated with the combination of the table format and the image format in the linkage function management table illustrated in FIG. 13. The controller 26 displays the information on the linkage functions in the display area 48a as a message content of the automatic response AI. In this way, the linkage function executable according to the formats of the data input by the user is notified to the user.

Specific Example 2

Specific Example 2 will be described with reference to FIG. 15. In Specific Example 1 described above, the user designates files as resources to be used for a service. Meanwhile, in Specific Example 2, a device and a file are designated as resources.

Figure 15:
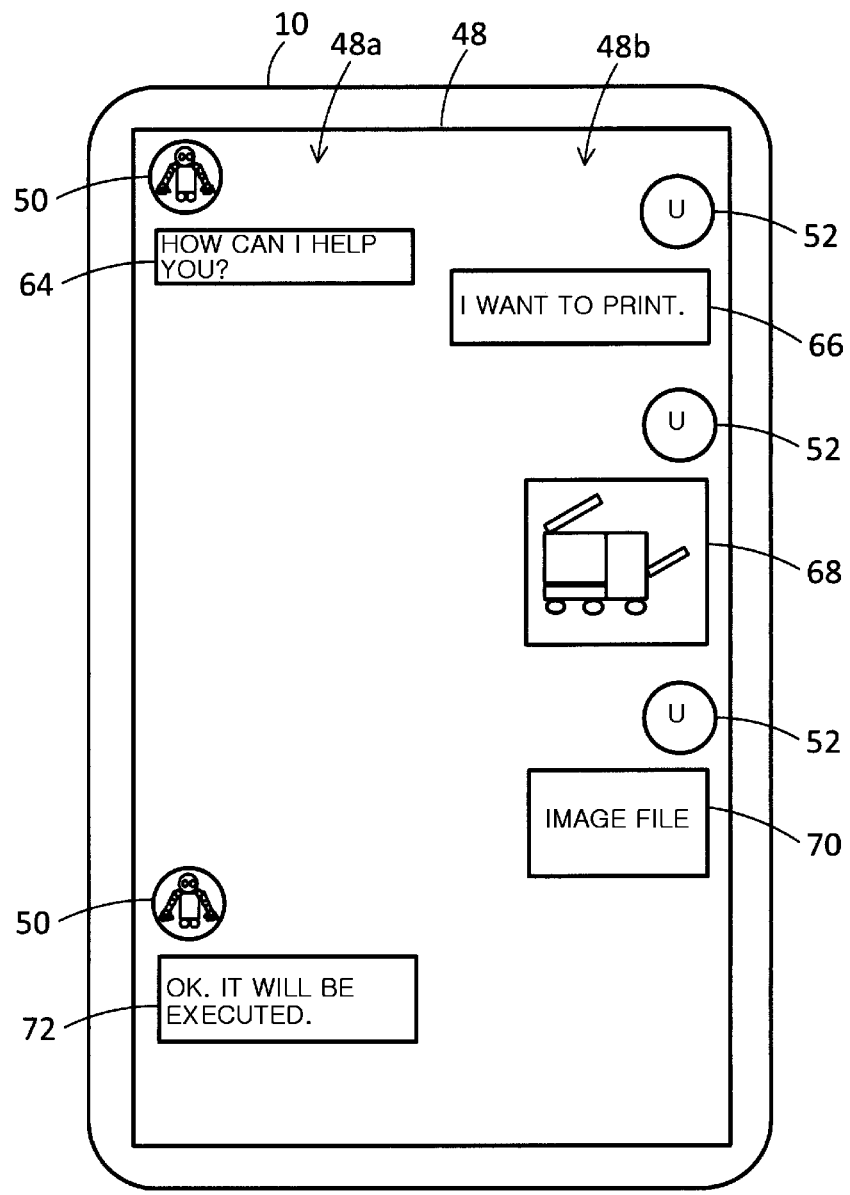
FIG. 15 is a view illustrates a screen.

FIG. 15 illustrates the screen 48. As in FIG. 14, the screen 48 displays the image 50 associated with the automatic response AI, the image 52 associated with the user, and information indicating a conversation between the user and the automatic response AI.

When the chatting program is started, first, the automatic response AI makes a common question (a question asking a user's request) of "How can I help you?," and a character string indicating the question is displayed as a message content 64 of the automatic response AI in the display area 48a.

In response to the message content 64 above, the user inputs information indicating a content of a service or information indicating a resource to be used for the service to the terminal device 10. For example, when the user makes a message of "I want to print," the message is displayed as a message content 66 in the display area 48b.

The information included in the message content 66 is information indicating a service requested by the user and belonging to the highest level among the information included in the instruction content of the user. The controller 26 transmits the message content 66 as the instruction content of the user to the automatic response AI. The automatic response AI analyzes the message content 66 of the user and identifies the service requested by the user.

Next, the user inputs information indicating a resource belonging to the lower level (a resource to be used for the service) than the level to which the service belongs, to the terminal device 10. In the example illustrated in FIG. 15, the information of the multifunction machine B which is a device is input by a message content 68 of the user to the terminal device 10, and subsequent to the message content 68, the information on the image file B which is a file is input by a message content 70 of the user to the terminal device 10. The multifunction machine B and the image file B correspond to an example of resources to be used for the service and are information belonging to the lower level than the level to which the service belongs. The information of the multifunction machine B is identification information for identifying the multifunction machine B and may be, for example, a device image associated with the multifunction machine B or text information or voice information indicating the identification information (e.g., a device name). The controller 26 transmits the message contents 68 and 70 as the instruction content of the user to the automatic response AI.

The multifunction machine B is a device identified by the specifying unit 28 by using the AR technique described above (the marker AR technique, the markerless AR technique, or the position information AR technique) or another identification technique. In addition, the device image may be an image associated with a type of a device such as a multifunction machine, rather than the image associated with the multifunction machine B itself.

In the example illustrated in FIG. 15, the device image associated with the multifunction machine B is input as the information of the multifunction machine B, and the file image associated with the image file B is input as the information of the image file B.

The controller 26 may display a stock area for the device images in the display area 48b for the user and display the device images in the stock area. For example, the controller 26 displays device images associated with already identified devices in the stock area. In addition, the controller 26 may display a device image associated with a type of a device, rather than a device itself, in the stock area. For example, the controller 26 may display a device image associated with a type of a device such as a multifunction machine, rather than the multifunction machine B itself, in the stock area. As in Specific Example 1, the user may take a device image out of the stock area for the device images and move the device image into the display area 48b as a message content of the user.

For example, the information on the already identified devices is stored in the memory 24, and the device images associated with the devices are displayed in the stock area later even when the process of identifying the devices is not performed again. In addition, the information on the identified devices may be deleted from the memory through an operation by the user. In this case, the device images associated with the devices are also deleted. As another example, the information on the identified devices may be deleted from the memory 24 after a linkage function is executed by using the identified devices or after a predetermined time elapses from the time when the devices are identified.

The device image associated with the multifunction machine B may be an image generated by capturing the multifunction machine B by the camera 22 (an image having a size at the capturing time or an enlarged or reduced image), or a schematic image (e.g., an icon) associated with the multifunction machine B.

When a schematic image is used, the specifying unit 28 specifies the schematic image associated with the identified device by referring to the device function management table illustrated in FIG. 6. The schematic image is displayed as a device image. The data of the schematic image may be stored in the terminal device 10 or an external device such as the server 16.

In addition, when image data generated by capturing a device is used, the image reflects the current external appearance of the device itself (for example, the external appearance reflecting a scratch, a memo, and a seal adhered to a device), and thus, there is an effect in that the user may visually confirm the difference from a similar type of other devices. Further, since a device image associated with a device itself (e.g., an image obtained by capturing or an icon associated with a device itself) is a unique image of the device, the automatic response AI may identify the device itself when the device image is transmitted to the automatic response AI. Meanwhile, when the device image is an image associated with a device type rather than a device itself, the automatic response AI may identify the device type from the device image, but may not identify an individual device itself. For example, when a device image is associated with the multifunction machine B, the automatic response AI may identify the multifunction machine B itself from the device image. Meanwhile, when a device image is associated with a device type such as a multifunction machine, the automatic response AI identifies the device type such as a multifunction machine from the device image. In the descriptions hereinbelow, it is assumed that each device image is an image associated with an individual device itself.

In addition, when there exists another device image that cannot be displayed in the stock area, the device image is displayed in the stock area in the manner that the user performs an operation to scroll the device images displayed in the stock area.

As described above in Specific Example 1, the stock area for the file images may be displayed, and a file image may be taken from the stock area and displayed in the display area 48b.

The specifying unit 28 analyzes the message content 68 and identifies the multifunction machine B as a resource to be used for the service. Similarly, the specifying unit 28 analyzes the message content 70 and identifies the image file B as a resource to be used for the service.

The specifying unit 28 analyzes the instruction content of the user, so as to identify the process corresponding to the instruction content and specify the resource candidates necessary for executing the process. In the example described above, the service indicated by "I want to print" which belongs to the highest level is identified, and further, the resources of "multifunction machine B and image file B" which belong to the lower level are identified. In this case, the specifying unit 28 identifies the process of "printing the image file B by the multifunction machine B," and specifies a function necessary for executing the process as a resource candidate. By referring to, for example, the device function management table illustrated in FIG. 6, the specifying unit 28 specifies the function of the multifunction machine B as a resource candidate necessary for executing the process described above.

As described above, when the function is specified as a resource candidate, the controller 26 may display the information on the function in the display area 48a as a message content of the automatic response AI. For example, when plural functions are specified, the controller 26 displays the information on the plural functions in the display area 48a as a message content of the automatic response AI. The controller 26 controls an execution of a function selected by the user from the plural functions. For example, when the user instructs the execution of the function, the controller 26 displays information indicating that the function is to be executed, in the display area 48a as a message content 72 of the automatic response AI.

In addition, when plural resource candidates have not been specified, the controller 26 may control an execution of a function specified by the specifying unit 28. In the example described above, since the process of "printing the image file B by multifunction machine B" is specified, the controller 26 may control the execution of the process. In this case, the controller 26 transmits the image file B to the multifunction machine B, and causes the multifunction machine B to print the image file B.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

As in Specific Example 1, the automatic response AI may create questions having the hierarchical structure and notify the user of the questions, so as to obtain an instruction content having the hierarchical structure from the user.

In the example illustrated in FIG. 15, the user inputs a message content 66 of "I want to print" as the user's reply to the question belonging to the highest level (e.g., the question of "How can I help you?"). Since the message content 66 indicates a content of a service, the automatic response AI determines that the user's reply is included in the assumed scope. In this case, the automatic response AI creates a question for specifying specific resources to be used for the service, as a question belonging to the lower level than the highest level. In order to execute the "printing" service, it is necessary to specify a specific "device" or "printing (operation) target," and thus, the automatic response AI creates a question for specifying the specific "device" or "printing target." In addition, the question for specifying the "device" is a question belonging to the middle level, and the question for specifying the "printing target" is a question belonging to the lower level. The controller 26 displays the question in the display area 48a as a message content of the automatic response AI. For example, in order to specify the specific "device," the automatic response AI creates a message content of "Which device do you want to use?," or in order to specify the specific "printing target," the automatic response AI creates a message content of "Which file do you want to print." Such message contents are displayed as message contents of the automatic response AI in the display area 48a. In the example illustrated in FIG. 15, the user inputs the information for specifying the specific "device" (information of multifunction machine B) as a message content 68 in response to the question belonging to the middle level. Further, the user inputs the information for specifying the specific "printing target" (information of the image file B) as a message content 70 in response to the question belonging to the lower level. Since the message contents 68 and 70 indicate resources to be used for the service, the automatic response AI determines that each of the user's replies is included in the assumed scope. When the specific process content is specified by the specifying unit 28 at this stage, the controller 26 may notify the user of information indicating a resource candidate necessary for executing the process (e.g., a candidate of a function). In the example illustrated in FIG. 15, the user first inputs the information indicating the content of the service belonging to the highest concept, and subsequently, inputs the information indicating the resource belonging to the middle concept (e.g., a device) and the information indicating the resource belonging to the lower concept (e.g., a file), so that the specific process content is gradually specified.

As in Specific Example 1, the specifying unit 28 may specify an executable process content and a resource candidate necessary for executing the process content (e.g., a candidate of a function) based on information input by the user within a time limit.

For example, it is assumed that under a circumstance where the content of the service indicated by the message content 66 is not precisely identified by and is unclear to the automatic response AI, the user inputs the message contents 68 and 70 within the time limit, and the contents indicated by the message contents 68 and 70 are precisely identified by the automatic response AI. In this case, the specifying unit 28 specifies a function executable by using the multifunction machine B indicated by the message content 68 and the image file B indicated by the message content 70 in the device function management table illustrated in FIG. 6, as a resource candidate necessary for executing the process content. For example, it is assumed that the "printing function" (process content: printing the image file B by the multifunction machine B), the "faxing function" (process content: faxing the image file B by the multifunction machine B), and the "data transferring function" (process content: transferring the image file B to another device by the multifunction machine B) are specified as functions and process contents. In this case, the controller 26 displays the information on the process contents and the functions specified by the specifying unit 28 in the display area 48a as a message content of the automatic response AI. When the user designates a function and gives an execution instruction, the controller 26 controls the execution of the function designated by the user.

As in Specific Example 1, the specifying unit 28 may specify an executable process content and a resource candidate necessary for executing the process content based on user's replies to a predetermined number of questions. In this case as well, questions having the hierarchical structure are notified to the user.

As in Specific Example 1, when the user inputs information belonging to the predetermined number of levels among the plural levels constituting the instruction content, the specifying unit 28 may specify an executable process content and a resource candidate necessary for executing the process content based on the input information.

In addition, information of a device may be notified as a resource candidate necessary for executing the process content to the user. For example, when the user inputs, as the message content 68, information of an unspecified multifunction machine or information of a type of a multifunction machine without inputting the information of the specific multifunction machine (e.g., the multifunction machine B), the specifying unit 28 specifies a device capable of printing the image file B (e.g., the multifunction machine B or a printer). The controller 26 displays the information on the device in the display area 48a as information on a device candidate for executing the process content of printing the image file B. For example, the information on the multifunction machine B is displayed as a message content of the automatic response AI in the display area 48a. In addition, when a process content or a function is specified by a message content of the user, the specifying unit 28 may specify a device necessary for executing the process content or a device having the function based on a setting desired by the user or the AI's prediction by the mechanical learning thereof, and the controller 26 may notify the user of the device specified by the specifying unit 28. For example, the specifying unit 28 specifies a device based on a positional relationship between the user and a device. Specifically, the specifying unit 28 specifies a device which is capable of executing the process content and is closest to the current position of the user, as a device to be notified, and the controller 26 notifies the user of the device. In addition, the specifying unit 28 may specify a device having a higher specification and a higher processing speed than those of other devices as a device to be notified, may specify a device usable for free as a device to be notified, or may specify a device of which operation authority that the user has as a device to be notified. The controller 26 notifies the user of the device specified as a device to be notified.

In addition, as a resource candidate necessary for executing the process content, information on a place where a device is installed may be notified to the user. For example, when the multifunction machine B is used, the specifying unit 28 specifies the installation place of the multifunction machine B. The controller 26 displays the information indicating the installation place in the display area 48*a* as a message content of the automatic response AI.

Specific Example 3

Specific Example 3 will be described with reference to FIG. 16. In Specific Example 3, functions are designated as resources to be used for a service.

Figure 16:
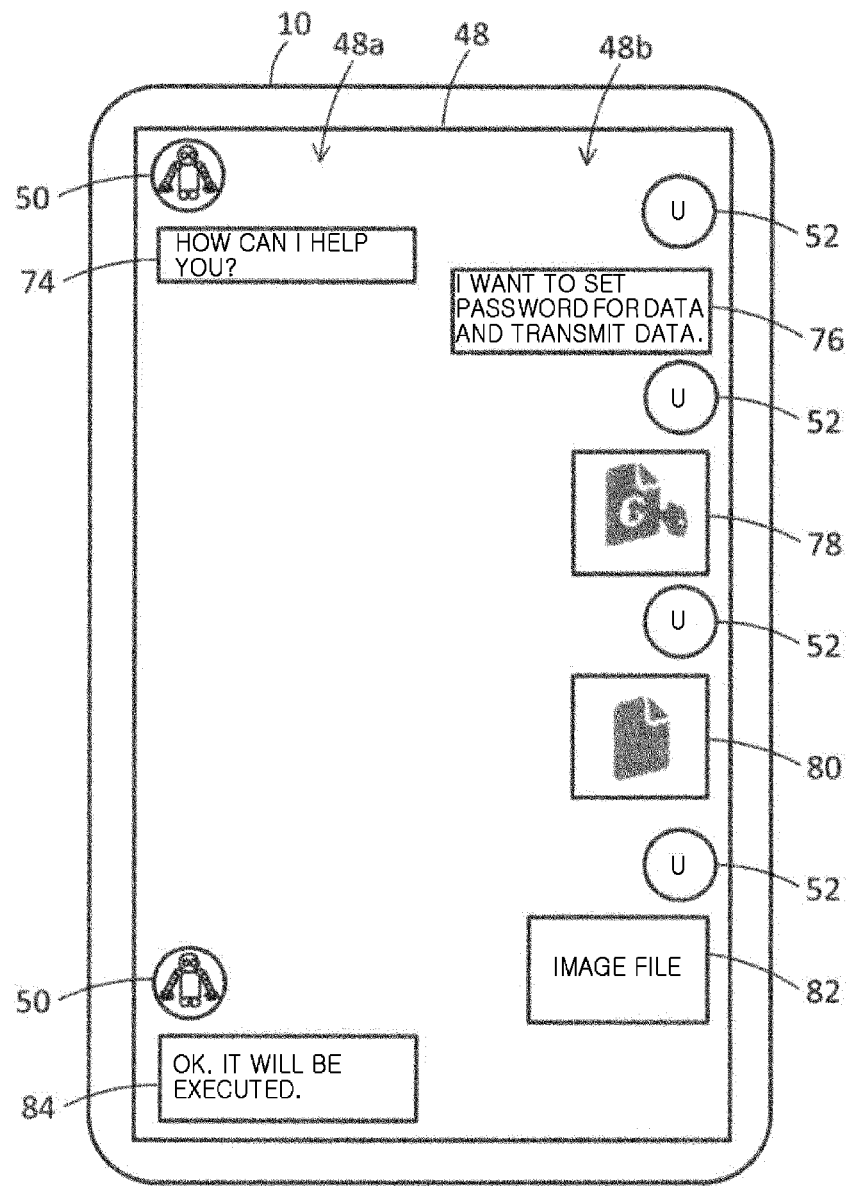
FIG. 16 is a view illustrating a screen.

FIG. 16 illustrates the screen 48. As in FIG. 14, the screen 48 displays the image 50 associated with the automatic response AI, the image 52 associated with the user, and information indicating a conversation between the user and the automatic response AI.

When the chatting program is started, first, the automatic response AI makes a common question (a question asking a user's request) of "How can I help you?," and a character string indicating the question is displayed as a message content 74 of the automatic response AI in the display area 48*a*.

In response to the message content 74, the user inputs information indicating a content of a service or information indicating resources to be used for the service, to the terminal device 10. For example, when the user makes a message of "I want to set a password for data and transmit the data," the message is displayed as a message content 76 in the display area 48*b*.

The information included in the message content 76 is information indicating the service requested by the user and belonging to the highest level among the information included in the instruction content of the user. The controller 26 transmits the message content 76 as the instruction content of the user to the automatic response AI. The automatic response AI analyzes the message content 76 of the user and identifies the service requested by the user.

Next, the user inputs information indicating a resource belonging to the lower level (a resource to be used for the service) than the level to which the service belongs, to the terminal device 10. In the example illustrated in FIG. 16, information of a password setting function which is a function is input by a message content 78 of the user to the terminal device 10; subsequent to the message content 78, information of a data transmitting function which is a function is input by a message content 80 to the terminal device 10; and subsequent to the message content 80, the information of the image file B which is a file is input subsequently to a message content 82 to the terminal device 10. The password setting function, the data transmitting function, and the image file B correspond to an example of resources to be used for the service and are information belonging to the lower level than the level to which the service belongs. The information of the password setting function is identification information for identifying the password setting function, and may be, for example, a function image associated with the password setting function (e.g., a function image associated with password setting software), or text information or voice information indicating the identification information (e.g., a name). Similarly, the information of the data transmitting function is identification information for identifying the data transmitting function, and may be, for example, a function image associated with the data transmitting function (e.g., a function image associated with data transmitting software), or text information or voice information indicating the identification information (e.g., a name). The controller 26 transmits the message contents 78, 80, and 82 as the instruction content of the user to the automatic response AI.

In the example illustrated in FIG. 16, the function image associated with the password setting function is input as the information of the password setting function, the function image associated with the data transmitting function is input as the information of the data transmitting function, and the file image associated with the image file B is input as the information of the image file B.

In addition, the function image may be, for example, an image associated with software (e.g., an application) or an image associated with a device by which a process is executed (a device existing in a real space). The function image is, for example, an image such as an icon and may be said as a virtual image which is distinguishable from an image representing the actual external appearance of a hardware device (for example, a photo) or an image representing a device itself.

The controller 26 may display a stock area for the function images in the display area 48*b* for the user and display the function images in the stock area. For example, the controller 26 displays, for example, function images associated with software installed in the terminal device 10 in the stock area. In addition, when there exists another function image that cannot be displayed in the stock area, the other function image is displayed in the stock area in the manner that the user performs an operation to scroll the function images displayed in the stock area. As in Specific Example 1, the user may take a function image out of the stock area for the function images and move the function image into the display area 48*b* as a message content of the user.

As described above in Specific Example 1, the stock area for the file images may be displayed, and a file image may be taken from the stock area and displayed in the display area 48*b*.

The specifying unit 28 analyzes the message content 78 and identifies the password setting function as a resource to be used for the service; analyzes the message content 80 and identifies the data transmitting function as a resource to be used for the service; and analyzes the message content 82 and identifies the image file B as a resource to be used for the service.

The specifying unit 28 analyzes the instruction content of the user, so as to identify the process corresponding to the instruction content and specify the resource candidates necessary for executing the process. In the example described above, the service indicated by "I want to set a password for data and transmit the data" which belongs to the highest level is identified, and further, the resources of the "password setting function," the "data transmitting function," and the "image file B" which belong to the lower level are identified. In this case, the specifying unit 28 identifies a process of "setting a password for the image file B and transmitting the image file B" and specifies a function necessary for executing the process as a resource candidate. By referring to, for example, the linkage function management table illustrated in FIG. 11, the specifying unit 28 specifies a linkage function associated with the combination of the password setting function β and the data transmitting function α, as a resource candidate necessary for executing the process described above.

When the linkage function is specified as a resource candidate as described above, the controller 26 may display the information on the linkage function in the display area 48*a* as a message content of the automatic response AI. For example, when plural linkage functions are specified, the controller 26 displays the information on the plural linkage functions in the display area 48*a* as a message content of the automatic response AI. The controller 26 controls an execution of a linkage function selected by the user from the plural linkage functions. For example, when the user instructs the execution of the linkage function, the controller 26 displays information indicating that the linkage function is to be executed, in the display area 48*a* as a message content 84 of the automatic response AI.

In addition, when plural resource candidates are not specified, the controller 26 may control an execution of a linkage function specified by the specifying unit 28. In the example described above, since the process of "setting a password for the image file B and transmitting the image file B" is specified, the controller 26 may control the execution of the process. In this case, the controller 26 starts the password setting software so as to set a password for the image file B by the password setting software, and starts the data transmitting software so as to transmit the image file B to a transmission destination by the data transmitting software.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

As in Specific Example 1, the automatic response AI may create questions having the hierarchical structure and notify the user of the questions, so as to obtain an instruction content having the hierarchical structure from the user.

In the example illustrated in FIG. 16, the user inputs the message content 76 of "I want to set a password for data and transmit the data" as the user's reply to the question belonging to the highest level (e.g., "How can I help you?"). Since the message content 76 indicates the content of the service, the automatic response AI determines that the user's reply is included in the assumed scope. In this case, the automatic response AI creates a question for specifying specific resources to be used for the service, as a question belonging to the lower level than the highest level. In order to execute the service for "setting a password for data and transmitting the data," it is necessary to specify specific "functions" or "operation target," and thus, the automatic response AI creates a question for specifying the specific "functions" or "operation target." In addition, the question for specifying the "functions" is a question belonging to the middle level, and the question for specifying the "operation target" is a question belonging to the lower level. The controller 26 displays the question in the display area 48*a* as a message content of the automatic response AI. For example, in order to specify the specific "functions," the automatic response AI creates a message content of "Which functions do you want to use?," or in order to specify the specific "operation target," the automatic response AI creates a message content of "Which file do you want to use?." Such message contents are displayed as a message content of the automatic response AI in the display area 48*a*. In the example illustrated in FIG. 16, the user inputs information for specifying the specific "functions" (information of the password setting function and the data transmitting function) as the message contents 78 and 80 in response to the question belonging to the middle level. Further, the user inputs information for specifying the specific "operation target" (information of the image file B) as the message content 82 in response to the question belonging to the lower level. Since the message contents 78, 80, and 82 indicate the resources to be used for the service, the automatic response AI determines that each of the user's replies is included in the assumed scope. When the specific process content is specified by the specifying unit 28 at this stage, the controller 26 notifies the user of information indicating a resource candidate necessary for executing the process content (e.g., a candidate of a linkage function). In the example illustrated in FIG. 16, first, the user inputs the information indicating the content of the service belonging to the highest concept, and subsequently, inputs the information indicating the resource belonging to the middle concept (e.g., a function) and the information indicating the resource belonging to the lower concept (e.g., a file), so that the specific process content is gradually specified.

As in Specific Example 1, the specifying unit 28 may specify an executable process content and a resource candidate necessary for executing the process content (e.g., a candidate of a linkage function) based on information input by the user within a time limit.

For example, it is assumed that under a circumstance where the content of the service indicated by the message content 76 is not precisely identified by and is unclear to the automatic response AI, the user inputs the message contents 78, 80, and 82 within the time limit, and the contents indicated by the message contents 78, 80, and 82 are precisely identified by the automatic response AI. In this case, the specifying unit 28 specifies a linkage function executable by using the password setting function indicated by the message content 78 and the data transmitting function indicated by the message content 80 in the linkage function management table illustrated in FIG. 11, as a resource candidate necessary for executing the process content. For example, the "function of setting a password for data and transmit the data" is specified as a linkage function, and the process of "setting a password for the image file B and transmitting the image file B" is specified as a specific process content. In this case, the controller 26 displays the information on the process content and the linkage function specified by the specifying unit 28 in the display area 48*a* as a message content of the automatic response AI. When the user designates the linkage function and gives an execution instruction, the controller 26 controls the execution of the linkage function designated by the user.

As in Specific Example 1, the specifying unit 28 may specify an executable process content and a resource candidate necessary for executing the process content based on user's replies to a predetermined number of questions. In this case as well, questions having the hierarchical structure are notified to the user.

As in Specific Example 1, when the user inputs information belonging to the predetermined number of levels among the plural levels constituting the instruction content, the specifying unit 28 may specify an executable process content and a resource candidate necessary for executing the process content based on the input information.

In addition, information of a function may be notified as a resource candidate necessary for executing the process content to the user. For example, when the user has not input the message content 78 indicating the password setting function, the specifying unit 28 specifies the password setting function necessary for executing the process content, as a result of the analysis of the message content 76 indicating the content of the service. The controller 26 displays the information on the password setting function in the display area 48*a* as information on the device candidate for executing the process content of setting a password for the image file B and transmitting the image file B.

Specific Example 4

Specific Example 4 will be described with reference to FIG. 17. In Specific Example 4, devices are designated as resources to be used for a service.

Figure 17:
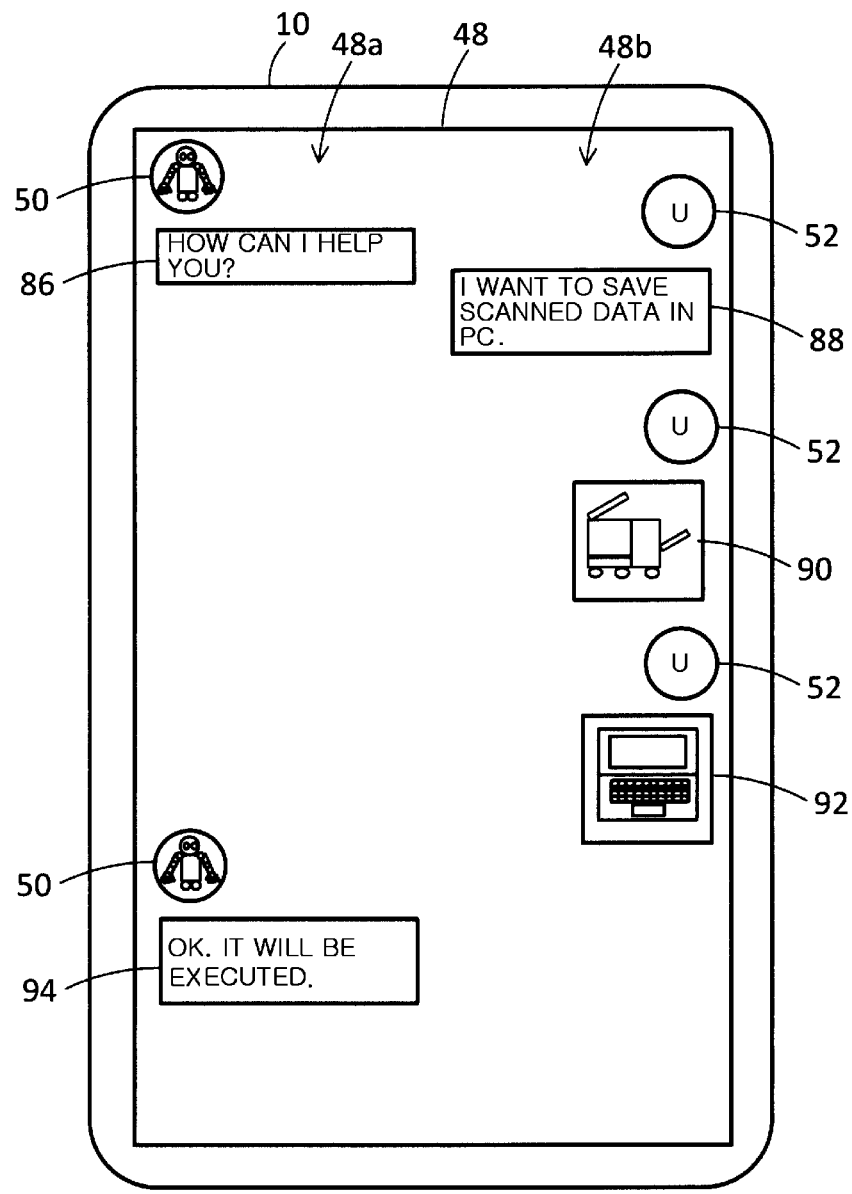
FIG. 17 is a view illustrating a screen.

FIG. 17 illustrates the screen 48. As in FIG. 14, the screen 48 displays the image 50 associated with the automatic response AI, the image 52 associated with the user, and information indicating a conversation between the user and the automatic response AI.

When the chatting program is started, first, the automatic response AI makes a common question (a question asking a user's request) of "How can I help you?," and a character string indicating the question is displayed as a message content 86 of the automatic response AI in the display area 48a.

In response to the message content 86 described above, the user inputs information indicating a content of a service or information indicating resources to be used for the service, to the terminal device 10. For example, when the user makes a message of "I want to save scanned data in a PC," the message is displayed as a message content 88 in the display area 48b.

The information included in the message content 88 is information indicating the service requested by the user and belonging to the highest level among the information included in the instruction content of the user. The controller 26 transmits the message content 88 as the instruction content of the user to the automatic response AI. The automatic response AI analyzes the message content 88 of the user and identifies the service requested by the user.

Next, the user inputs information indicating a resource belonging to the lower level (a resource to be used for the service) than the level to which the service belongs, to the terminal device 10. In the example illustrated in FIG. 17, the information of the multifunction machine B which is a device is input by a message content 90 of the user to the terminal device 10, and subsequent to the message content 90, the information of the PC A which is a device is input by a message content 92 to the terminal device 10. The multifunction machine B and the PC A correspond to an example of the resources to be used for the service and are information belonging to the lower level than the level to which the service belongs. The controller 26 transmits the message contents 90 and 92 as the instruction content of the user to the automatic response AI.

In the example illustrated in FIG. 17, the device image associated with the multifunction machine B is input as the information of the multifunction machine B, and the device image associated with the PC A is input as the information of the PC A.

The controller 26 may display a stock area for the device images in the display area 48b for the user and display the device images in the stock area. As in Specific Example 1, the user may take a device image out of the stock area for the device images and move the device image into the display area 48b as a message content of the user.

The specifying unit 28 analyzes the message content 90 so as to identify the multifunction machine B as a resource to be used for the service, and analyzes the message content 92 so as to identify the PC A as a resource to be used for the service.

The specifying unit 28 analyzes the instruction content of the user, so as to identify the process corresponding to the instruction content and specify the resource candidates necessary for executing the process. In the example described above, the service indicated by "I want to save scanned data in a PC" which belongs to the highest level is identified, and further, the resources of the "multifunction machine B and the PC A" which belong to the lower level are identified. In this case, the specifying unit 28 identifies a process of "scanning data by the multifunction machine B and transmitting the data generated by the scanning from the multifunction machine B to the PC A," and specifies a linkage function necessary for executing the process as a resource candidate. By referring to, for example, the linkage function management table illustrated in FIG. 7, the specifying unit 28 specifies a linkage function associated with the combination of the multifunction machine B and the PC A, as a resource candidate necessary for executing the process described above.

When the linkage function is specified as a resource candidate as described above, the controller 26 may display the information on the linkage function in the display area 48a as a message content of the automatic response AI. For example, when plural linkage functions are specified, the controller 26 displays the information on the plural linkage functions in the display area 48a as a message content of the automatic response AI. For example, when the "scanning transmitting function" and the "printing function" are specified as linkage functions, the controller 26 displays the information on the linkage functions in the display area 48a as a message content of the automatic response AI. The controller 26 controls an execution of a linkage function selected by the user from the plural linkage functions. For example, when the user instructs the execution of the linkage function, the controller 26 displays information indicating that the linkage function is to be executed, in the display area 48a as a message content 94 of the automatic response AI.

In addition, when plural resource candidates are not specified, the controller 26 may control an execution of a linkage function specified by the specifying unit 28. In the example described above, since the process of "scanning data by the multifunction machine B and transmitting the data generated by the scanning from the multifunction machine B to the PC A" is specified, the controller 26 may control the execution of the process (the "scanning transmitting function" which is a linkage function). In this case, the controller 26 gives a scanning transmitting instruction to the multifunction machine B. The multifunction machine B performs the scanning and transmits the data generated by the scanning to the PC A, according to the scanning transmitting instruction.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

As in Specific Example 1, the automatic response AI may create questions having the hierarchical structure and notify the user of the questions, so as to obtain an instruction content having the hierarchical structure from the user.

In the example illustrated in FIG. 17, the user inputs the message content 88 of "I want to save scanned data in a PC" as the user's reply to the question belonging to the highest level (e.g., the question of "How can I help you?"). Since the message content 88 indicates the content of the service, the automatic response AI determines that the user's reply is included in the assumed scope. In this case, the automatic response AI creates a question for specifying specific resources to be used for the service, as a question belonging to the lower level than the highest level. In order to execute the service indicated by "I want to save scanned data in a PC," it is necessary to specify specific "devices," and thus, the automatic response AI creates a question for specifying the specific "devices." The controller 26 displays the question in the display area 48*a* as a message content of the automatic response AI. For example, in order to specify the specific "devices," the automatic response AI creates a message content of "Which devices do you want to use?" Such message content is displayed as a message content of the automatic response AI in the display area 48*a*. In the example illustrated in FIG. 17, the user inputs information for specifying the specific "devices" (information of the multifunction machine B and the PC A) as message contents 90 and 92 in response to the question belonging to the middle level. Since the message contents 90 and 92 indicate the resources to be used for the service, the automatic response AI determines that each of the user's replies is included in the assumed scope. When the specific process content is specified by the specifying unit 28 at this stage, the controller 26 notifies the user of information indicating a resource candidate necessary for executing the process content (e.g., a candidate of a linkage function). In the example illustrated in FIG. 17, first, the user inputs the information indicating the content of the service belonging to the highest concept, and subsequently, inputs the information indicating the resources belonging to the middle concept (e.g., devices), so that the specific process content is gradually specified.

As in Specific Example 1, the specifying unit 28 may specify an executable process content and a resource candidate necessary for executing the process content (e.g., a candidate of a linkage function) based on information input by the user within a time limit.

For example, it is assumed that under a circumstance where the content of the service indicated by the message content 88 is not precisely identified by and is unclear to the automatic response AI, the user inputs the message contents 90 and 92 within the time limit, and the contents indicated by the message contents 90 and 92 are precisely identified by the automatic response AI. In this case, the specifying unit 28 specifies linkage functions executable by using the multifunction machine B indicated by the message content 90 and the PC A indicated by the message content 92 in the linkage function management table illustrated in FIG. 7, as resource candidates necessary for executing the process content. For example, the "scanning transmitting function" and the "printing function" are specified as the linkage functions, and the process of "scanning data by the multifunction machine B and transmitting the data generated by the scanning from the multifunction machine B to the PC A" and the process of "printing the data saved in the PC A by the multifunction machine B" are specified as the specific process content. In this case, the controller 26 displays the information on the process content and the linkage function specified by the specifying unit 28 in the display area 48*a* as a message content of the automatic response AI. When the user designates the linkage function and gives an execution instruction, the controller 26 controls the execution of the linkage function designated by the user.

As in Specific Example 1, the specifying unit 28 may specify an executable process content and a resource candidate necessary for executing the process content based on user's replies to a predetermined number of questions. In this case as well, questions having the hierarchical structure are notified to the user.

As in Specific Example 1, when the user inputs information belonging to the predetermined number of levels among the plural levels constituting the instruction content, the specifying unit 28 may specify an executable process content and a resource candidate necessary for executing the process content based on the input information.

In addition, information of a device or information of an installation place of a device may be notified as a resource candidate necessary for executing the process content to the user.

Specific Example 5

Specific Example 5 will be described with reference to FIG. 18. In Specific Example 5, a device and a function are designated as resources to be used for a service.

Figure 18:
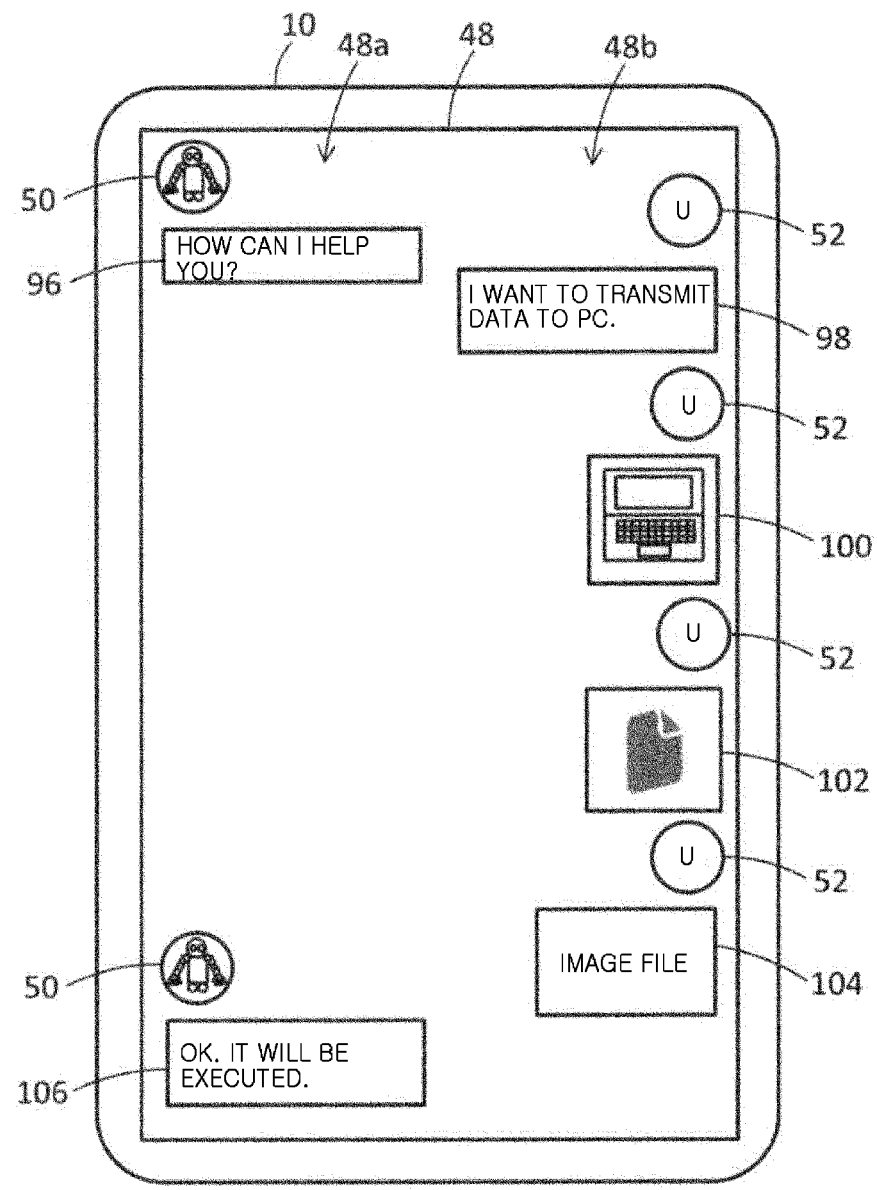
FIG. 18 is a view illustrates a screen.

FIG. 18 illustrates the screen 48. As in FIG. 14, the screen 48 displays the image 50 associated with the automatic response AI, the image 52 associated with the user, and information indicating a conversation between the user and the automatic response AI.

When the chatting program is started, first, the automatic response AI makes a common question (a question asking a user's request) of "How can I help you?," and a character string indicating the question is displayed as a message content 96 of the automatic response AI in the display area 48*a*.

In response to the message content 96, the user inputs information indicating a content of a service or information indicating resources to be used for the service, to the terminal device 10. For example, when the user makes a message of "I want to transmit data to a PC," the message is displayed as a message content 98 in the display area 48*b*.

The information included in the message content 98 is information indicating the service requested by the user and belonging to the highest level among the information included in the instruction content of the user. The controller 26 transmits the message content 98 as the instruction content of the user to the automatic response AI. The automatic response AI analyzes the message content 98 of the user and identifies the service requested by the user.

Next, the user inputs information indicating a resource belonging to the lower level (a resource to be used for the service) than the level to which the service belongs, to the terminal device 10. In the example illustrated in FIG. 18, the information of the PC A which is a device is input by a message content 100 of the user to the terminal device 10; subsequent to the message content 100, the information of the data transmitting function which is a function is input by a message content 102 to the terminal device 10; and subsequent to the message content 102, the information of the image file B which is an operation target is input by a message content 104 to the terminal device 10. The PC A, the data transmitting function, and the image file B correspond to an example of resources to be used for the service and are information belonging to the lower level than the level to which the service belongs. The controller 26 transmits the message contents 100, 102, and 104 as the instruction content of the user to the automatic response AI.

In the example illustrated in FIG. 18, a device image associated with the PC A is input as the information of the PC A, a function image associated with the data transmitting function is input as the information of the data transmitting function, and a file image associated with the image file B is input as the information of the image file B.

The controller 26 may display a stock area for the device image, a stock area for a function image, and a stock area for the file image in the display area 48*b* for the user. The user may take the device image, the function image, and the file image out of the respective stock areas, and move the images into the display area 48*b* as message contents of the user.

The specifying unit 28 analyzes the message content 100 so as to identify the multifunction machine B as a resource to be used for the service; analyzes the message content 102 so as to identify the data transmitting function as a resource to be used for the service; and analyzes the message content 104 so as to identify the image file B as a resource to be used for the service.

The specifying unit 28 analyzes the instruction content of the user, so as to identify the process corresponding to the instruction content and specify the resource candidates necessary for executing the process. In the example described above, the service indicated by "I want to transmit data to a PC" which belongs to the highest level is identified, and further, the resources of the "PC A, data transmitting function, and the image file B" which belong to the lower level are identified. In this case, the specifying unit 28 identifies the process of "transmitting the image file B to the PC A" and specifies a linkage function necessary for executing the process as a resource candidate. By referring to, for example, the linkage function management table illustrated in FIG. 12, the specifying unit 28 specifies a linkage function associated with the combination of the PC A and the data transmitting function α, as a resource candidate necessary for executing the process described above.

When the linkage function is specified as a resource candidate as described above, the controller 26 may display the information on the linkage function in the display area 48*a* as a message content of the automatic response AI. For example, when plural linkage functions are specified, the controller 26 displays the information on the plural linkage functions in the display area 48*a* as a message content of the automatic response AI. The controller 26 controls an execution of a linkage function selected by the user from the plural linkage functions. For example, when the user instructs the execution of the linkage function, the controller 26 displays information indicating that the linkage function is to be executed, in the display area 48*a* as a message content 106 of the automatic response AI.

In addition, when plural resource candidates are not specified, the controller 26 may control an execution of a linkage function specified by the specifying unit 28. In the example described above, since the process of "transmitting the image file B to the PC A" is specified, the controller 26 may control the execution of the process. In this case, the controller 26 starts the data transmitting software and transmits the image file B to the PC A by the data transmitting software.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

As in Specific Example 1, the automatic response AI may create questions having the hierarchical structure and notify the user of the questions, so as to obtain an instruction content having the hierarchical structure from the user.

In the example illustrated in FIG. 18, the user inputs the message content 98 of "I want to transmit data to a PC" as the user's reply to the question belonging to the highest level (e.g., "How can I help you?"). Since the message content 98 indicates the content of the service, the automatic response AI determines that the user's reply is included in the assumed scope. In this case, the automatic response AI creates a question for specifying specific resources to be used for the service, as a question belonging to the lower level than the highest level. In order to execute the service for "transmitting data to a PC," it is necessary to specify a specific "device," "function," or "operation target," and thus, the automatic response AI creates a question for specifying the specific "device," "function," or "operation target." In addition, the question for specifying the "device" or the "function" belongs to the middle level, and the question for specifying the "operation target" belongs to the lower level. The controller 26 displays the question in the display area 48*a* as a message content of the automatic response AI. For example, in order to specify the specific "device," the automatic response AI creates a message content of "Which device do you want to use?," in order to specify the specific "function," the automatic response AI creates a message content of "Which function do you want to use," or in order to specify the specific "operation target," the automatic response AI creates a message content of "Which file do you want to transmit?." Such message contents are displayed as message contents of the automatic response AI in the display area 48*a*. In the example illustrated in FIG. 18, the user inputs the information for specifying the specific "device" and "function" (information of the PC A and the data transmitting function) as the message contents 100 and 102 in response to the questions belonging to the middle level. Further, the user inputs the information for specifying the specific "operation target" (information of the image file B) as the message content 104 in response to the question belonging to the lower level. Since the message contents 100, 102, and 104 indicate the resources to be used for the service, the automatic response AI determines that each of the user's replies is included in the assumed scope. When the specific process content is specified by the specifying unit 28 at this stage, the controller 26 notifies the user of information indicating a resource candidate necessary for executing the process content (e.g., a candidate of a linkage function). In the example illustrated in FIG. 18, the user inputs the information indicating the content of the service belonging to the highest concept, and subsequently, inputs the information indicating the resources belonging to the middle concept (e.g., a device and a function) and the information indicating the resource belonging to the lower concept (e.g., a file), so that the specific process content is gradually specified.

As in Specific Example 1, the specifying unit 28 may specify an executable process content and a resource candidate necessary for executing the process content (e.g., a candidate of a linkage function) based on information input by the user within a time limit.

For example, it is assumed that under a circumstance where the content of the service indicated by the message content 98 is not precisely identified by and is unclear to the automatic response AI, the user inputs the message contents 100, 102, and 104 within the time limit, and the contents indicated by the message contents 100, 102, and 104 are precisely identified by the automatic response AI. In this case, the specifying unit 28 specifies a linkage function executable by using the PC A indicated by the message content 100 and the data transmitting function indicated by the message content 102 in the linkage function management table illustrated in FIG. 12, as a resource candidate necessary for executing the process content. For example, the "function of transmitting data to a PC" is specified as the linkage function, and the process of "transmitting the image file B to the PC A" is specified as the specific process content. In this case, the controller 26 displays the information on the process content and the linkage function specified by the specifying unit 28 in the display area 48*a* as a message content of the automatic response AI. When the user designates the linkage function and gives an execution instruction, the controller 26 controls the execution of the linkage function designated by the user.

As in Specific Example 1, the specifying unit 28 may specify an executable process content and a resource candidate necessary for executing the process content based on user's replies to a predetermined number of questions. In this case as well, questions having the hierarchical structure are notified to the user.

As in Specific Example 1, when the user inputs information belonging to the predetermined number of levels among the plural levels constituting the instruction content, the specifying unit 28 may specify an executable process content and a resource candidate necessary for executing the process content based on the input information.

In addition, information of a device or a function may be notified as a resource candidate necessary for executing the process content to the user. In addition, information of an installation place of a device may be notified to the user.

Specific Example 6

Hereinafter, Specific Example 6 will be described. In Specific Example 6, portions of devices are designated as resources to be used for a service.

Figure 19A:
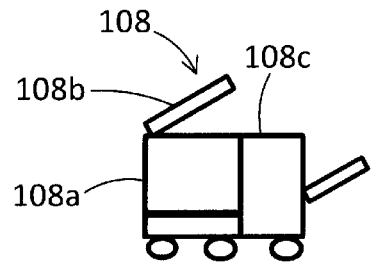
FIGS. 19A and 19B are views illustrating device images.
Figure 19B:
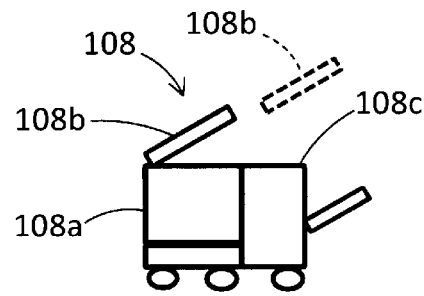
Figure 20A:
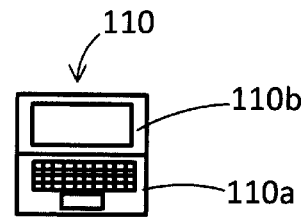
FIGS. 20A and 20B are views illustrating device images.
Figure 20B:
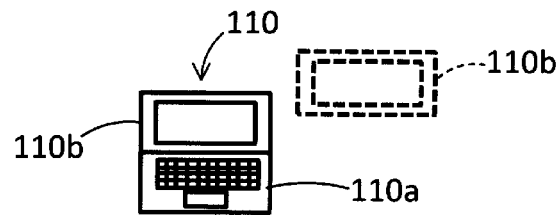

With reference to FIGS. 19A and 19B, portions of a device will be described in detail. Each of FIGS. 19A and 19B illustrates a device image 108 associated with the multifunction machine B which is a device. Each of FIGS. 20A and 20B illustrates a device image 110 associated with the PC A which is a device. The multifunction machine B or the PC A is identified by applying the identification technique as described above (for example, the AR technique). In addition, the identification of a portion is also implemented by using the identification technique described above. For example, each portion of a device is identified by capturing each portion and using the markerless AR technique.

For example, as illustrated in FIG. 19A, the "printing function" is assigned to the position associated with the main body portion of the multifunction machine B (a portion image 108*a*) in the device image 108. The "scanning function" is assigned to the position associated with the document cover, the document glass, or the automatic document feeder of the multifunction machine B (a portion image 108*b*) in the device image 108. A "stapling function" is assigned to the position associated with the post-processing device (a portion image 108*c*) in the device image 108. The "stapling function" is a function of binding output papers with a staple.

In addition, as illustrated in FIG. 20A, a "data saving function" is assigned to the position associated with the main body portion of the PC A (a portion image 110*a*) in the device image 110. A "screen displaying function" is assigned to the specific position associated with the display unit of the PC A (a portion image 110*b*) in the device image 110. The "data saving function" is a function of saving data transmitted from another device in the PC A. The "screen displaying function" is a function of displaying data transmitted from another device by the PC A.

Each portion image may be operated to be separated from the device image. For example, when the device image 108 is displayed on the display unit of the UI unit 20, and the user selects the portion image 108*b* and performs an operation to separate the portion image 108*b* from the device image 108, the portion image 108*b* is displayed apart from the device image 108 as illustrated in FIG. 19B. In FIG. 19B, the separated portion image 108*b* is indicated by a dashed line. For example, the portion image may be operated by the dragging and dropping operations. Specifically, the user may select a portion image, separate the portion image from the device image by performing the dragging operation, and display the portion image at a desired display position by performing the dropping operation at the display position. In addition, when the device image 108 is displayed in the stock area, and the user selects a portion image (e.g., the portion image 108*b*) of the device image 108 and performs an operation to separate the portion image 108*b* from the device image 108, the portion image 108*b* may be displayed apart from the device image 108 outside the stock area. In addition, even though the operation to separate the portion image from the device image has been performed, the portion image may be still displayed at the original position. The portion images 108*a* and 108*c* may also be displayed to be separated from the device image 108.

In the device image 110 as well, the portion images 110*a* and 110*b* may be displayed to be separated from the device image 110, as in the device image 108. In FIG. 20B, the portion image 110*b* (indicated by a dashed line) is separated from the device image 110.

Figure 21:
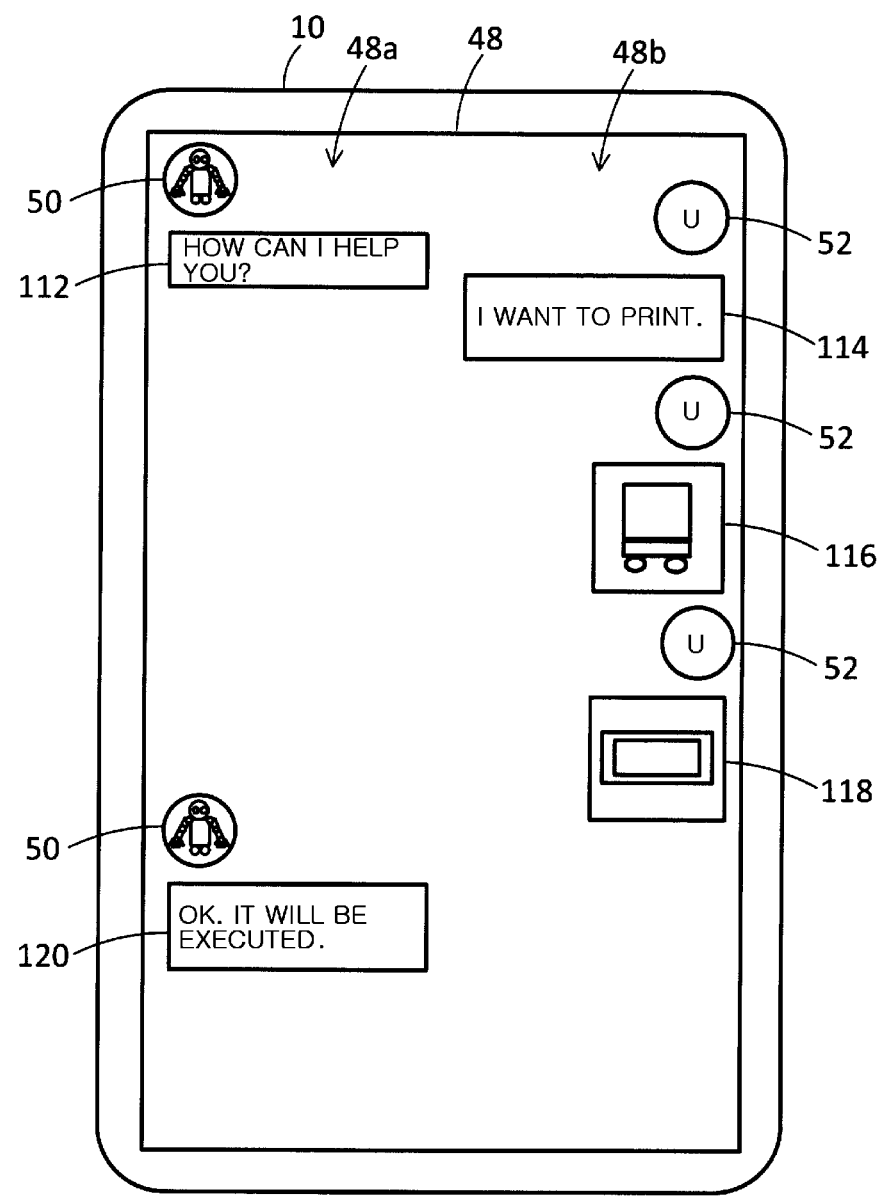
FIG. 21 is a view illustrating a screen.

Hereinafter, Specific Example 6 will be described in detail with reference to FIG. 21. FIG. 21 illustrates the screen 48. As in FIG. 14, the screen 48 displays the image 50 associated with the automatic response AI, the image 52 associated with the user, and information indicating a conversation between the user and the automatic response AI.

When the chatting program is started, first, the automatic response AI makes a common question (a question asking a user's request) of "How can I help you?," and a character string indicating the question is displayed as a message content 112 of the automatic response AI in the display area 48*a*.

In response to the message content 112, the user inputs information indicating a content of a service or information indicating resources to be used for the service, to the terminal device 10. For example, when the user makes a message of "I want to print," the message is displayed as a message content 114 in the display area 48*b*.

The information included in the message content 114 is information indicating the service requested by the user and belonging to the highest level among the information included in the instruction content of the user. The controller 26 transmits the message content 114 as the instruction content of the user to the automatic response AI. The automatic response AI analyzes the message content 114 of the user and identifies the service requested by the user.

Next, the user inputs information indicating a resource belonging to the lower level (a resource to be used for the service) than the level to which the service belongs, to the terminal device 10. In the example illustrated in FIG. 21, the user inputs information of the main body portion of the multifunction machine B which is a portion of a device by a message content 116 of the user to the terminal device 10, and subsequent to the message content 116, inputs information of the display unit of the PC A which is a portion of a device by a message content 118 to the terminal device 10. The multifunction machine B and the PC A correspond to an example of the resources to be used for the service and are information belonging to the lower level than the level to which the service belongs. The controller 26 transmits the message contents 116 and 118 as the instruction content of the user to the automatic response AI.

In the example illustrated in FIG. 21, a portion image associated with the main body portion of the multifunction machine B is input as the information of the main body portion of the multifunction machine B, and a portion image associated with the display unit of the PC A is input as the information of the display unit of the PC A.

The controller 26 may display a stock area for the device images in the display area 48b for the user. The user may take the portion images out of the stock area by separating the portion images from the device images displayed in the stock area, and move the portion images into the display area 48b as message contents of the user.

The specifying unit 28 analyzes the message content 116 so as to identify the main body portion of the multifunction machine B as a resource to be used for the service; and analyzes the message content 118 so as to identify the display unit of the PC A as a resource to be used for the service.

The specifying unit 28 analyzes the instruction content of the user, so as to identify the process corresponding to the instruction content and specify the resource candidates necessary for executing the process. In the example described above, the service indicated by "I want to print" which belongs to the highest level is identified, and further, the resources of the "main body portion of the multifunction machine B and the display unit of the PC A" which belong to the lower level are identified. In this case, the specifying unit 28 specifies a linkage function associated with the combination of the main body portion of the multifunction machine B and the display unit of the PC A as a resource candidate necessary for executing the process content, by referring to the linkage function management table illustrated in FIG. 10. For example, the "function of printing information displayed on the screen of a PC by a multifunction machine" is specified as the linkage function, and the process of "printing information displayed on the screen of the PC A by the multifunction machine B" is identified as the specific process content.

When the linkage function is specified as a resource candidate as described above, the controller 26 may display the information on the linkage function in the display area 48a as a message content of the automatic response AI. For example, when plural linkage functions are specified, the controller 26 displays the information on the plural linkage functions in the display area 48a as a message content of the automatic response AI. The controller 26 controls an execution of a linkage function selected by the user from the plural linkage functions. For example, when the user instructs the execution of the linkage function, the controller 26 displays information indicating that the linkage function is to be executed, in the display area 48a as a message content 120 of the automatic response AI.

In addition, when plural resource candidates are not specified, the controller 26 may control an execution of a linkage function specified by the specifying unit 28. In the example described above, since the process of "printing information displayed on the screen of the PC A by the multifunction machine B" is specified, the controller 26 may control the execution of the process. In this case, the controller 26 transmits the information indicating the execution instruction of the process to the PC A and the multifunction machine B. According to the execution instruction, the PC A transmits the information displayed on the screen of the PC A to the multifunction machine B. According to the execution instruction, the multifunction machine B prints the information transmitted from the PC A.

As described above, the user inputs the information belonging to the highest level and the information belonging to lower levels in this order as a message content of the user to the terminal device 10, so that the specific process content to be executed is gradually clarified. Therefore, the specific content is specified by the specifying unit 28.

As in Specific Example 1, the automatic response AI may create questions having the hierarchical structure and notify the user of the questions, so as to obtain an instruction content having the hierarchical structure from the user.

In the example illustrated in FIG. 21, the user inputs the message content 114 of "I want to print" as the user's reply to the question belonging to the highest level (e.g., the question of "How can I help you?"). Since the message content 114 indicates the content of the service, the automatic response AI determines that the user's reply is included in the assumed scope. In this case, the automatic response AI creates a question for specifying specific resources to be used for the service, as a question belonging to the lower level than the highest level. In order to execute the "printing" service, it is necessary to specify a specific "device," "function," or "operation target," and thus, the automatic response AI creates a question for specifying the specific "device," "function," or "operation target." In addition, the question for specifying the "device" or the "function" belongs to the middle level, and the question for specifying the "operation target" belongs to the lower level. The controller 26 displays the question in the display area 48a as a message content of the automatic response AI. For example, in order to specify the specific "device," the automatic response AI creates a message content of "Which device do you want to use?," in order to specify the specific "function," the automatic response AI creates a message content of "Which function do you want to use," or in order to specify the specific "operation target," the automatic response AI creates a message content of "Which file do you want to transmit?." Such message contents are displayed as message contents of the automatic response AI in the display area 48a. In the example illustrated in FIG. 21, the user inputs information for specifying the specific "portions of devices" (information of the display unit of the PC A and the main body portion of the multifunction machine B) as message contents 116 and 118 in response to the question belonging to the middle level. Since the message contents 116 and 118 indicate the resources to be used for the service, the automatic response AI determines that each of the user's replies is included in the assumed scope. When the specific process content is specified by the specifying unit 28 at this stage, the controller 26 notifies the user of information indicating a resource candidate necessary for executing the process content (e.g., a candidate of a linkage function). In the example illustrated in FIG. 21, first, the user inputs the information indicating the content of the service belonging to the highest concept, and subsequently, inputs the information indicating the resources belonging to the middle concept (e.g., portions of devices), so that the specific process content is gradually specified.

As in Specific Example 1, the specifying unit 28 may specify an executable process content and a resource candidate necessary for executing the process content (e.g., a candidate of a linkage function) based on information input by the user within a time limit.

For example, it is assumed that under a circumstance where the content of the service indicated by the message content 114 is not precisely identified by and is unclear to the automatic response AI, the user inputs the message contents 116 and 118 within the time limit, and the contents indicated by the message contents 116 and 118 are precisely identified by the automatic response AI. In this case, the specifying unit 28 specifies a linkage function executable by using the main body portion of the multifunction machine B indicated by the message content 116 and the display unit of the PC A indicated by the message content 118 in the linkage function management table illustrated in FIG. 10, as a resource candidate necessary for executing the process content. For example, the "function of printing information displayed on the screen of a PC by a multifunction machine" is specified as the linkage function, and the process of "printing information displayed on the screen of the PC A by the multifunction machine B" is specified as the specific process content. In this case, the controller 26 displays the information on the process content and the linkage function specified by the specifying unit 28 in the display area 48a as a message content of the automatic response AI. When the user designates the linkage function and gives an execution instruction, the controller 26 controls the execution of the linkage function designated by the user.

As in Specific Example 1, the specifying unit 28 may specify an executable process content and a resource candidate necessary for executing the process content based on user's replies to a predetermined number of questions. In this case as well, questions having the hierarchical structure are notified to the user.

As in Specific Example 1, when the user inputs information belonging to the predetermined number of levels among the plural levels constituting the instruction content, the specifying unit 28 may specify an executable process content and a resource candidate necessary for executing the process content based on the input information.

In addition, information of an installation place of a device may be notified as a resource candidate necessary for executing the process content to the user.

Specific Examples 1 to 6 described above are merely examples. For example, a device, a portion of a device or a function may be used alone as a resource for executing a process content.

Hereinafter, a process for correcting a message content of the user will be described as Specific Examples 7 to 10.

Specific Example 7

Hereinafter, Specific Example 7 will be described. In Specific Example 7, in a case where plural pieces of information belonging to the same level are successively input to the terminal device 10 as message contents of the user and transmitted to the automatic response AI, the specifying unit 28 uses the information input later, in place of the information input earlier, as the information included in the instruction content. Hereinafter, Specific Example 7 will be described in detail with reference to FIG. 22.

Figure 22:
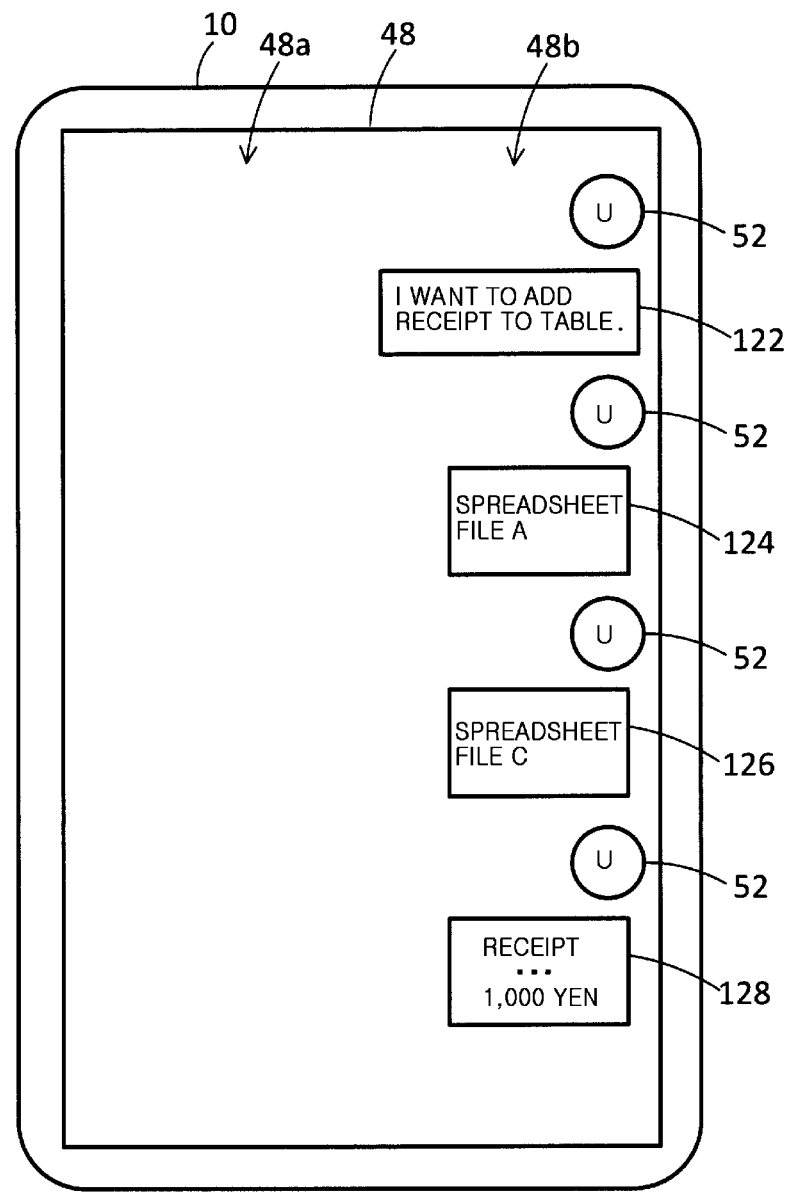
FIG. 22 is a view illustrating a screen.

FIG. 22 illustrates the screen 48. As in FIG. 14, the screen 48 displays the image 50 associated with the automatic response AI, the image 52 associated with the user, and information indicating a conversation between the user and the automatic response AI. For the convenience of the descriptions, FIG. 22 omits the illustration of the image 50 associated with the automatic response AI and the message contents of the automatic response AI.

For example, as in FIG. 14, information indicating a content of a service is input as a message content 122 of the user to the terminal device 10, and subsequent to the message content 122, information of a file (e.g., information of the spreadsheet file A) is input as a message content 124 of the user to the terminal device 10. The controller 26 transmits the message contents 122 and 124 to the automatic response AI. The automatic response AI identifies the content of the service and the file indicated by the message contents 122 and 124.

Subsequent to the message content 124, information of a file (e.g., information of the spreadsheet file C) is input as a message content 126 of the user to the terminal device 10. The controller 26 transmits the message content 126 to the automatic response AI. The automatic response AI identifies the file indicated by the message content 126. The information of the spreadsheet file C indicated by the message content 126 is information belonging to the same level as that of the information of the spreadsheet file A indicated by the previous message content 124. In this case, the specifying unit 28 identifies the spreadsheet file C indicated by the later message content 126, in place of the spreadsheet file A indicated by the earlier message content 124, as the information included in the instruction content of the user. That is, the specifying unit 28 identifies the spreadsheet file C, in place of the spreadsheet file A, as a file to be processed.

Subsequent to the message content 126, information of a file (e.g., information of the image file B) is input as a message content 128 of the user to the terminal device 10. In this case, as in Specific Example 1 described above, the specifying unit 28 specifies the process of "adding the image file B to the spreadsheet file C," as a specific process content.

The same applies to a case where information of a device or a function which is a resource other than the files is input as a message content of the user.

In addition, even in a case where information of plural resources belonging to the same level is successively input, the resource input later may be used in addition to the resource input earlier, rather than using the resource input later in place of the resource input earlier. In the example illustrated in FIG. 22, there may be a case where the image file B is added to the spreadsheet files A and C. For example, when a button image for adding a resource is displayed on the screen 48, and the user presses the button image to input the message content 126, the specifying unit 28 identifies both the spreadsheet files A and C as files to be processed. Meanwhile, when the user inputs the message content 126 without pressing the button image, the specifying unit 28 identifies the spreadsheet file C, in place of the spreadsheet file A, as a file to be processed. As another example, when the user inputs the message content 126 by inputting a character string indicating the addition of a resource, the specifying unit 28 may identify both the spreadsheet files A and C as files to be processed.

According to Specific Example 7, the instruction content of the user may be corrected through the simple operation.

Specific Example 8

Hereinafter, Specific Example 8 will be described. In Specific Example 8, in a case where information belonging to the lower level is input as a message content of the user to the terminal device 10 and transmitted to the automatic response AI, and then, information belonging to the higher level is input as a message content of the user to the terminal device 10 and transmitted to the automatic response AI, the specifying unit 28 identifies that the user gives an instruction to change the service. Hereinafter, Specific Example 8 will be described with reference to FIG. 23.

Figure 23:
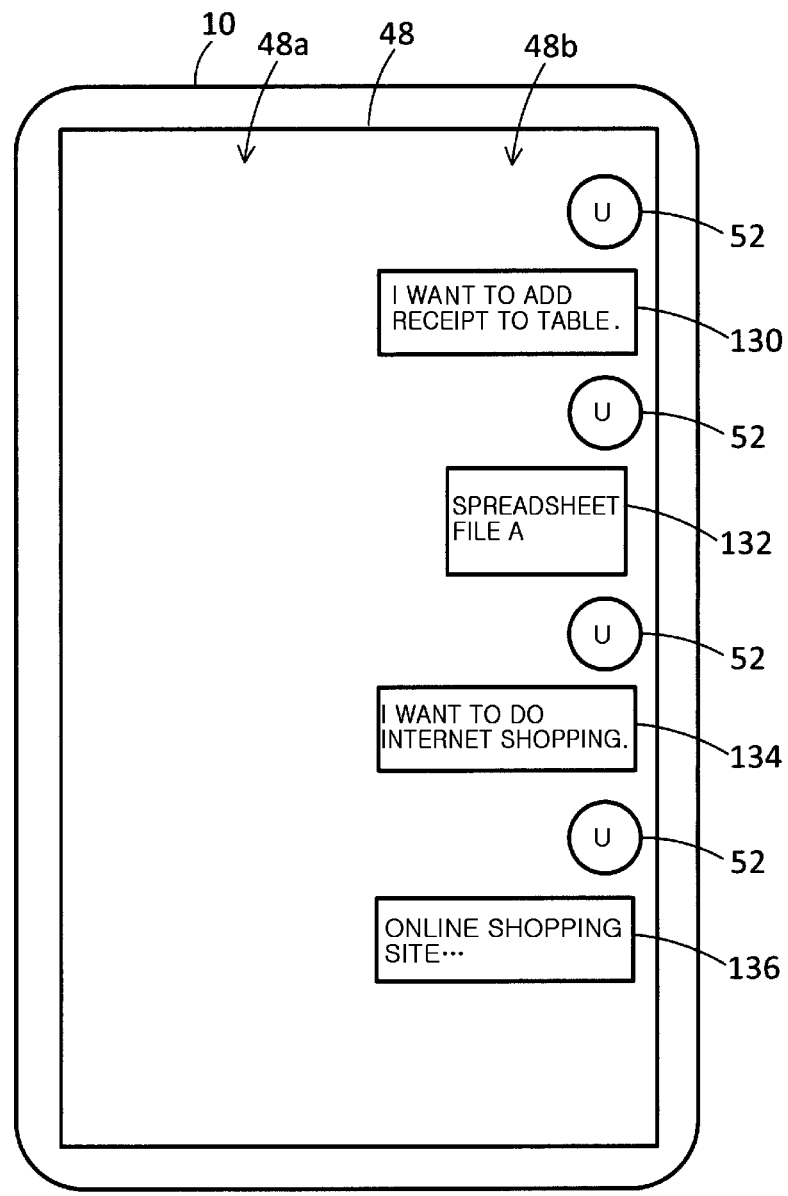
FIG. 23 is a view illustrates a screen.

FIG. 23 illustrates the screen 48. As in FIG. 14, the screen 48 displays the image 50 associated with the automatic response AI, the image 52 associated with the user, and information indicating a conversation between the user and the automatic response AI. For the convenience of the descriptions, FIG. 23 omits the illustration of the image 50 associated with the automatic response AI and the message contents of the automatic response AI.

For example, as in FIG. 14, information indicating a content of a service (information belonging to the highest level) is input as a message content 130 of the user to the terminal device 10, and subsequent to the message content 130, information of the spreadsheet file A (information belonging to the lower level) is input as a message content 132 of the user to the terminal device 10. The service requested by the user is "adding a receipt to a table." The controller 26 transmits the message contents 130 and 132 to the automatic response AI. The automatic response AI identifies the content of the service and the file indicated by the message contents 130 and 132.

Subsequent to the message content 132, information indicating a content of a service (information belonging to the highest level) is input as a message content 134 of the user to the terminal device 10. The service requested by the user is "Internet shopping." The controller 26 transmits the message content 134 to the automatic response AI. The automatic response AI identifies the content of the service indicated by the message content 134.

As described above, when the message content 134 indicating the information belonging to the highest level is input to the terminal device 10 and transmitted to the automatic response AI after the message content 132 indicating the information belonging to the lower level, the specifying unit 28 identifies that the user gives an instruction to change the service. That is, the specifying unit 28 identifies that the user designates the "Internet shopping" service indicated by the message content 134, in place of the service for "adding a receipt to a table" indicated by the message content 130. In this case, the specifying unit 28 identifies the process content based on the message content 134 and its subsequent message content.

Subsequent to the message content 134, address information (e.g., a URL) of an online shopping site (e.g., a homepage on the Internet) is input as a message content 136 of the user to the terminal device 10. The controller 26 transmits the message content 136 to the automatic response AI. The automatic response AI identifies the address information indicated by the message content 136. In this case, the specifying unit 28 identifies the process content to be executed based on the message contents 134 and 136. In the example illustrated in FIG. 23, the specifying unit 28 specifies a process content of "accessing the address information of the online shopping site input by the user." The controller 26 starts, for example, a Web browser and accesses the online shopping site. In addition, the controller 26 may display the information indicating the process content described above in the display area 48a as a message content of the automatic response AI. When the user gives an access instruction, the controller 26 activates, for example, the Web browser and accesses the online shopping site.

According to Specific Example 8, the content of the service may be changed through the simple operation.

Specific Example 9

Hereinafter, Specific Example 9 will be described. In Specific Example 9, when the user presses the area where a message content of the user is displayed for a long time period (when the user designates the area over a predetermined time or longer), the controller 26 causes the UI unit 20 to display an editing screen for editing the message content. Hereinafter, Specific Example 9 will be described in detail with reference to FIG. 24.

Figure 24:
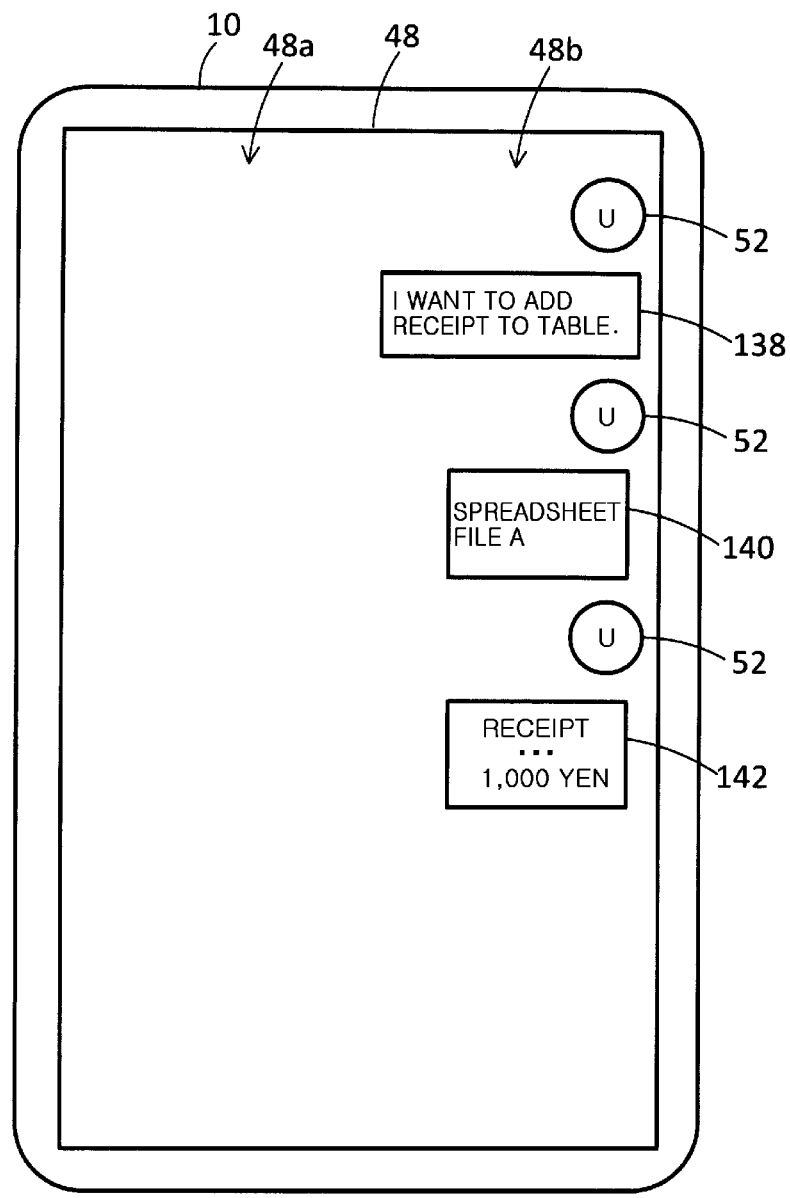
FIG. 24 is a view illustrates a screen.

FIG. 24 illustrates the screen 48. As in FIG. 14, the screen 48 displays the image 50 associated with the automatic response AI, the image 52 associated with the user, and information indicating a conversation between the user and the automatic response AI. For the convenience of the descriptions, FIG. 24 omits the illustration of the image 50 associated with the automatic response AI and the message contents of the automatic response AI.

For example, the user inputs a message content 138 indicating a content of a service, a message content 140 indicating the spreadsheet file A, and a message content 142 indicating the image file B, to the terminal device 10. The controller 26 sends the message contents 138, 140, and 142 to the automatic response AI, and the automatic response AI identifies the information indicated by the message contents 138, 140, and 142 as the instruction content of the user.

Here, descriptions will be made on a case where the message content 140 already transmitted to the automatic response AI is edited. When the user presses the area where the message content 140 is displayed for a long time period on the screen 48, the controller 26 detects the long press and causes the display unit of the UI unit 20 to display an editing screen for editing the message content 140. When the user edits the message content 140 on the editing screen, the message content 140 reflecting the editing is displayed at the original position. The controller 26 transmits the message content 140 reflecting the editing to the automatic response AI. The automatic response AI identifies the information indicated by the message content 140 reflecting the editing, in place of the unedited message content 140, as the instruction content of the user.

According to Specific Example 9, the message content already transmitted to the automatic response AI may be edited through the simple operation.

Specific Example 10

Figure 25:
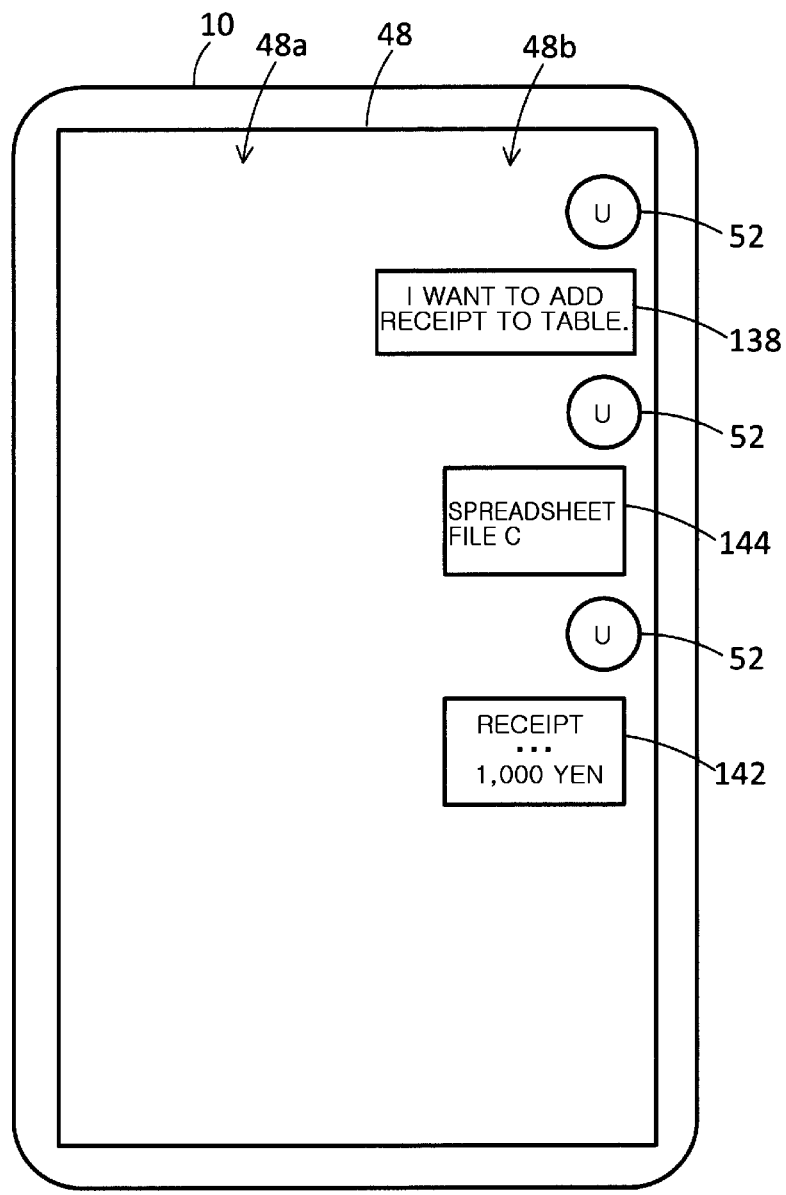
FIG. 25 is a view illustrates a screen.

Hereinafter, Specific Example 10 will be described with reference to FIGS. 24 and 25. FIG. 25 illustrates the screen 48.

For example, as illustrated in FIG. 24, the user inputs the message content 138 indicating a content of a service, the message content 140 indicating the spreadsheet file A, and the message content 142 indicating the image file B, to the terminal device 10. The controller 26 sends the message contents 138, 140, and 142 to the automatic response AI, and the automatic response AI identifies the information indicated by the message contents 138, 140, and 142 as the instruction content of the user.

When the user gives an instruction to delete the message content 140, and subsequently, inserts a new message content 144 into the display position of the message content 140 as illustrated in FIG. 25 by using the UI unit 20, the controller 26 transmits the new message content 144 as a message content replacing the original message content 140, to the automatic response AI. The automatic response AI identifies the information indicated by the new message content 144, in place of the original message content 140, as the instruction content of the user. For example, although the information of the spreadsheet file A has been input as the original message content 140 to the terminal device 10, the information of the spreadsheet file C is currently input as the new message content 144 to the terminal device 10. In this case, the automatic response AI identifies the spreadsheet file C, in place of the spreadsheet file A, as the instruction content of the user.

In addition, the user may insert a new message content between plural message contents without deleting a message content. For example, in the example illustrated in FIG. 24, the user may insert a new message content between the message contents 140 and 142 without deleting the message content 140. In this case, the controller 26 sends the new message content to the automatic response AI, and the automatic response AI identifies the information indicated by the new message content as the instruction content of the user.

According to Specific Example 10, the message content already transmitted to the automatic response AI may be edited through the simple operation.

Figure 26:
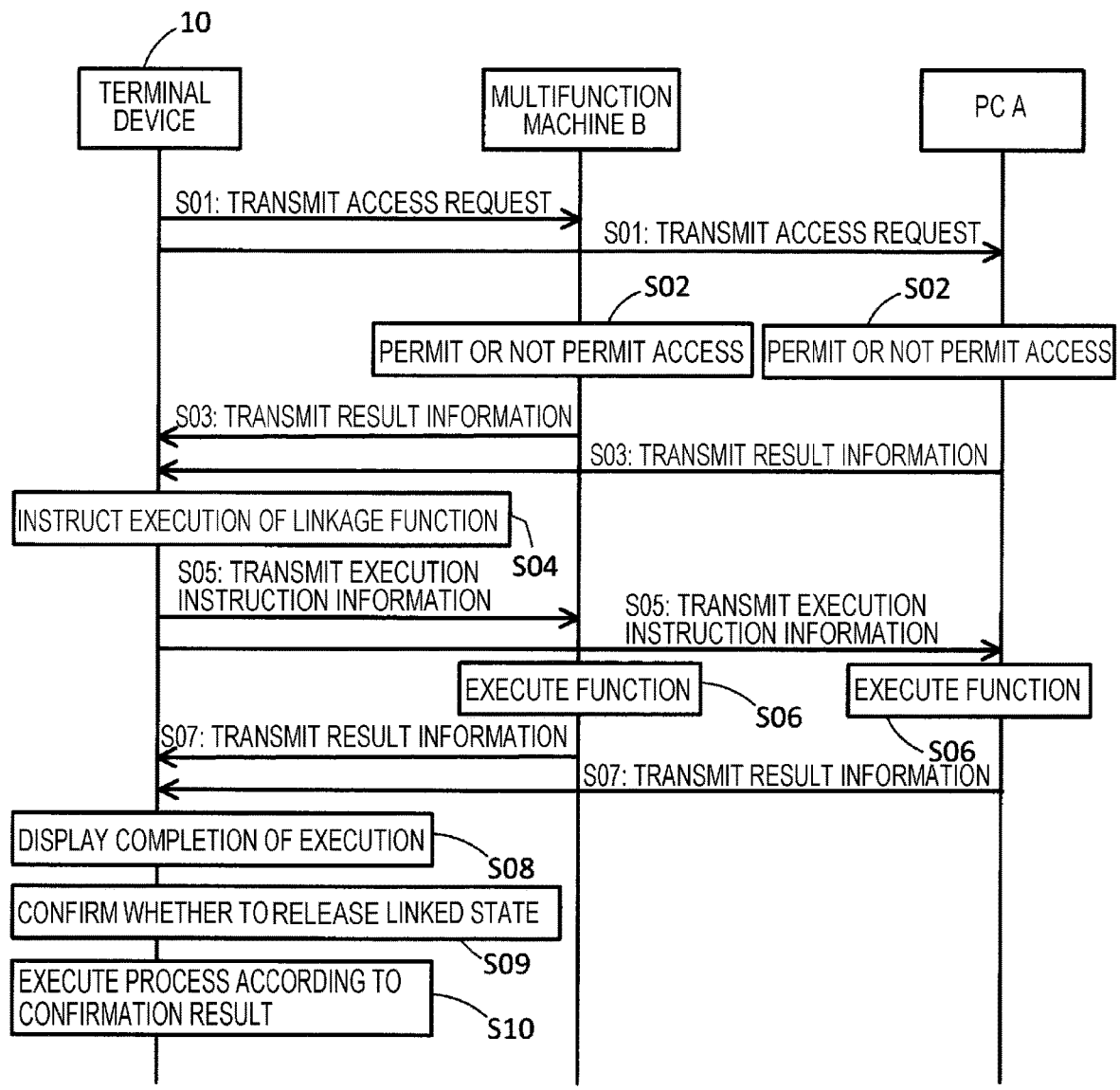
FIG. 26 is a sequence diagram illustrating operations when plural devices are used.

Hereinafter, operations performed when a linkage function is executed by using plural devices will be described. When a linkage function is executed, an access request is transmitted from the terminal device 10 to each of the devices to be linked, and the terminal device 10 is connected to each of the devices. Hereinafter, the access process will be described with reference to FIG. 26. FIG. 26 is a sequence diagram illustrating the access process.

In the terminal device 10, when the user designates the multifunction machine B and the PC A as devices to be linked (that is, when the user transmits the information of the multifunction machine B and the PC A as a conversation content of the user to the automatic response AI), the terminal device 10 transmits information indicating an access request to the devices to be linked (the multifunction machine B and the PC A) (S01). The control of the transmission may be performed by the automatic response AI. For example, when address information of each of the devices to be linked is stored in the server 16, the terminal device 10 acquires the address information of each of the devices from the server 16. When the device identification information of each of the devices includes the address information, the controller 26 of the terminal device 10 acquires the address information from the device identification information. The process of acquiring the address information may be performed by the automatic response AI. In addition, the address information of each of the devices may be stored in the memory 24 of the terminal device 10. The terminal device 10 may acquire the address information of each of the devices by another method. The terminal device 10 transmits the information indicating the access request to each of the devices to be linked (for example, the multifunction machine B and the PC A), by using the address information of each of the devices to be linked.

Upon receiving the information indicating the access request, the multifunction machine B and the PC A determine whether or not to permit the access to the terminal device 10 (S02). For example, when the multifunction machine B and the PC A correspond to devices to which access is not permitted, or when the number of devices requesting an access exceeds an upper limit, the access is not permitted. In addition, when the access from the terminal device 10 is permitted, the terminal device 10 may be prohibited from performing an operation to change the unique setting information of each of the multifunction machine B and the PC A. For example, it may be prohibited to change color parameters of the multifunction machine B or setting time for shifting to power saving. Thus, the security of the devices to be linked is improved. As another example, when the devices are linked to each other, the change of the setting information may be restrictively performed, as compared with a case where each device is used alone. For example, it may be permitted to change a smaller number of setting items, as compared with a case where a device is used alone. In addition, it may be prohibited to refer to personal information of another user such as the operation history. Accordingly, the security of the personal information of the user is improved.

Result information indicating a permission or non-permission of the access is transmitted from the multifunction machine B and the PC A to the terminal device 10 (S03). When the access to the multifunction machine B and the PC A is permitted, a communication between the terminal device 10 and the multifunction machine B is established, and further, a communication between the terminal device 10 and the PC A is established.

Next, in the terminal device 10, the user instructs an execution of a linkage function (for example, the "printing function") (S04). According to the instruction, the terminal device 10 transmits information indicating the instruction to execute the linkage function (execution instruction information) to each of the devices to be linked (e.g., the multifunction machine B and the PC A) (S05). The control of the transmission may be performed by the automatic response AI. The execution instruction information transmitted to the multifunction machine B includes information indicating a process to be executed by the multifunction machine B (for example, job information), and the execution instruction information transmitted to the PC A includes information indicating a process to be executed by the PC A (for example, job information).

Upon receiving the execution instruction information, the multifunction machine B and the PC A execute the linkage function (for example, the "printing function") according to the execution instruction information (S06). When the linkage function to be executed includes a process of transmitting and receiving data between the multifunction machine B and the PC A, a communication between the multifunction machine B and the PC A is established. For example, the execution instruction information transmitted to the multifunction machine B includes the address information of the PC A, and the execution instruction information transmitted to the PC A includes the address information of the multifunction machine B. The communication between the multifunction machine B and the PC A is established by using the address information. When the communication is established, the PC A transmits image data to be printed to the multifunction machine B, and the multifunction machine B prints the image data on a paper which is a recording medium.

When the execution of the linkage function is completed, information indicating the completion of the execution of the linkage function is transmitted from the multifunction machine B and the PC A to the terminal device 10 (S07). The UI unit 20 of the terminal device 10 displays the information indicating the completion of the execution of the linkage function (S08). In addition, when the information indicating the completion of the execution is not displayed even after preset time elapses from the time when the execution instruction is given, the controller 26 of the terminal device 10 may cause the UI unit 20 to display information indicating an error, and transmit the execution instruction information or the information indicating the access request to the multifunction machine B and the PC A again.

Next, the user confirms whether to release the linked state between the multifunction machine B and the PC A (S09), and a process corresponding to the confirmation result is executed (S10). When the linked state is released, the user gives a release instruction by using the terminal device 10. Accordingly, the communication between the terminal device 10 and the multifunction machine B is disconnected, and the communication between the terminal device 10 and the PC A is disconnected. Similarly, the communication between the multifunction machine B and the PC A is also disconnected. When the linked state is not released, the execution instruction may be continuously given.

The present exemplary embodiment may also be applied when an automatic execution processing by robotics process automation (RPA) is set. For example, when pieces of information on a device, a function, or a file are transmitted by a setting person to the automatic response AI, a combination of the transmitted pieces of information and a linkage function associated with the combination are saved as setting contents, and a process is executed according to the setting contents. As for the RPA (Robotics Process Automation), for example, a routine process such as data input or a job executable by a combination of plural pieces of application software, a process such as data collection or analysis, or a process of learning and making a determination based on data may be performed.

Each of the terminal device 10, the devices 12 and 14, and the server 16 is implemented by, for example, cooperation of hardware and software. Specifically, each of the terminal device 10, the devices 12 and 14, and the server 16 includes one processor or plural processors such as a CPU (not illustrated). The function of each unit of the terminal device 10, the devices 12 and 14, and the server 16 is implemented in the manner that the one processor or the plural processors read and execute a program stored in a storage device (not illustrated). The program is stored in the storage device via a recording medium such as a CD or a DVD or a communication path such as a network. As another example, each unit of the terminal device 10, the devices 12 and 14, and the server 16 may be implemented by, for example, a hardware resource such as a processor, an electronic circuit, or an application specific integrated circuit (ASIC). For the implementation, a device such as a memory may be used. As yet another example, each unit of the terminal device 10, the devices 12 and 14, and the server 16 may be implemented by, for example, a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a controller that, when an instruction content including information indicating a content of a service and information of a resource to be used for the service is transmitted to a conversation partner in an interface where a user makes a conversation with the conversation partner, controls a notification of information on a process corresponding to the instruction content, the controller specifies linkage functions associated with a combination of message contents unceasingly input by the user without being interrupted by a message content from the conversation partner within a time limit, as resource candidates for executing the process,
   wherein the instruction content includes replies having a hierarchical structure, and wherein when a plurality of pieces of information belonging to a same level is successively transmitted as the instruction content to the conversation partner, information that is transmitted later, in place of information that is transmitted earlier, is used as information included in the instruction content.

2. The information processing device according to claim 1, wherein when an image file is used as the resource, the image file is inserted into a specific file used in the service.

3. The information processing device according to claim 1, wherein the conversation partner is configured to make questions having a hierarchical structure in order to provide the service, and
   the instruction content includes user's replies to the questions.

4. The information processing device according to claim 3, wherein the conversation partner is configured to make questions belonging to respective levels in descending order of level, as the questions having the hierarchical structure.

5. The information processing device according to claim 4, wherein the conversation partner is configured to make a question belonging to a same or lower level according to the user's reply to the question.

6. The info nation processing device according to claim 1, wherein the controller controls a notification of information according to user's replies to a predetermined number of questions, as the information on the process.

7. The information processing device according to claim 1, wherein when information belonging to a predetermined number of levels among a plurality of levels constituting the instruction content is transmitted to the conversation partner, the controller controls the notification of the information on the process specified by the information transmitted to the conversation partner.

8. The information processing device according to claim 1, wherein when information belonging to a lower level is transmitted to the conversation partner and then, information belonging to a higher level is transmitted to the conversation partner, an instruction to change the service is given.

9. The information processing device according to claim 1, wherein the controller displays respective pieces of information included in the instruction content on the interface according to an order of a transmission to the conversation partner, and transmits new information that is inserted at an intermediate position in a sequence of the respective pieces of information as the information included in the instruction content to the conversation partner.

10. The information processing device according to claim 1, wherein when information included in the instruction content is deleted and new information is input, the controller transmits the new information as the information included in the instruction content to the conversation partner.

11. The information processing device according to claim 1, wherein the information on the process is information indicating a candidate of a function for executing the process.

12. The information processing device according to claim 11, wherein when a plurality of pieces of data which are different in format from each other are transmitted as information included in the instruction content to the conversation partner, the controller controls a notification of a function executable by using the plurality of pieces of data, as the control of the notification of the information on the process.

13. The information processing device according to claim 1, wherein the controller controls the notification of the information on the process according to the instruction content transmitted to the conversation partner within a time limit.

14. The information processing device according to claim 1, wherein a plurality of the users can join the conversation.

15. The information processing device according to claim 1, wherein a plurality of the conversation partners can join the conversation.

16. The information processing device according to claim 1, wherein when an image file is used as the resource, the image file is designated from one or plural images displayed in a specific area on the interface.

17. The information processing device according to claim 1, wherein
   the controller further controls a display of an editing screen for editing the resource transmitted to the conversation partner, and
   when the editing is completed, the editing is reflected on the resource.

18. The information processing device according to claim 1, wherein the instruction content is input by user's voice.

19. An information processing method comprising:
   when an instruction content including information indicating a content of a service and information of a resource to be used for the service is transmitted to a conversation partner in an interface where a user makes a conversation with the conversation partner, controlling a notification of information on a process corresponding to the instruction content, and specifying linkage functions associated with a combination of message contents unceasingly input by the user without being interrupted by a message content from the conversation partner within a time limit, as resource candidates for executing the process,
   wherein the instruction content includes replies having a hierarchical structure, and wherein when a plurality of pieces of information belonging to a same level is successively transmitted as the instruction content to the conversation partner, information that is transmitted later, in place of information that is transmitted earlier, is used as information included in the instruction content.

20. A non-transitory computer readable medium storing a program causing a computer to execute information processing, the information processing comprising:
   when an instruction content including information indicating a content of a service and information of a resource to be used for the service is transmitted to a conversation partner in an interface where a user makes a conversation with the conversation partner, controlling a notification of information on a process corresponding to the instruction content, and specifying linkage functions associated with a combination of message contents unceasingly input by the user without being interrupted by a message content from the conversation partner within a time limit, as resource candidates for executing the process,
   wherein the instruction content includes replies having a hierarchical structure, and wherein when a plurality of pieces of information belonging to a same level is successively transmitted as the instruction content to the conversation partner, information that is transmitted later, in place of information that is transmitted earlier, is used as information included in the instruction content.

* * * * *